United States Patent
Aiken et al.

(10) Patent No.: US 12,315,502 B1
(45) Date of Patent: May 27, 2025

(54) ON-DEVICE COMMANDS UTILIZING UTTERANCE PATTERNS

(71) Applicant: Amazon Technologies, Inc., Seattle, WA (US)

(72) Inventors: Mark Aiken, Seattle, WA (US); Ritu Jain, Newcastle, WA (US); Caglar Iskender, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 458 days.

(21) Appl. No.: 17/364,159

(22) Filed: Jun. 30, 2021

(51) Int. Cl.
  *G10L 15/22*  (2006.01)
  *G06F 16/632*  (2019.01)
  *G10L 15/18*  (2013.01)
  *G10L 15/30*  (2013.01)

(52) U.S. Cl.
  CPC ............ *G10L 15/22* (2013.01); *G06F 16/632* (2019.01); *G10L 15/1815* (2013.01); *G10L 15/30* (2013.01); *G10L 2015/223* (2013.01); *G10L 2015/228* (2013.01)

(58) Field of Classification Search
  USPC ............... 704/246, 247, 251, 252, 257, 275
  See application file for complete search history.

(56) References Cited

U.S. PATENT DOCUMENTS

| | | | |
|---|---|---|---|
| 10,102,844 B1* | 10/2018 | Mois | G06F 16/3329 |
| 2020/0082814 A1* | 3/2020 | Xiong | G10L 15/22 |
| 2020/0175986 A1* | 6/2020 | Jones | G06F 3/167 |
| 2021/0027775 A1* | 1/2021 | Park | G06F 3/167 |

* cited by examiner

*Primary Examiner* — Leonard Saint-Cyr
(74) *Attorney, Agent, or Firm* — Eversheds Sutherland (US) LLP

(57) ABSTRACT

Systems and methods for caching on-device commands utilizing utterance patterns are disclosed. For example, user utterances and resulting selected commands are analyzed to determine which utterances result in consistently-selected commands. Pattern data is generated indicating an association between these utterances and commands. The pattern data is stored in an on-device storage and utilized to select a command to be performed when the associated utterances are identified from audio data. When new features are developed for cloud-side services, a determination is made as to whether commands and utterances associated with the new features are candidates for utterance-to-command patterns, and corresponding pattern data may be sent to the on-device storages.

20 Claims, 11 Drawing Sheets

800

802
Receive, over period of time, first audio data representing multiple utterances received at voice interface device associated with account data, utterances requesting action to be performed by first device associated with voice interface device

804
Determine that first audio data over period of time resulted in selection of first command to perform action being sent to voice interface device, determining indicating selection of first command repeatedly

806
Generate, in response to determining that first command was selected repeatedly, first data associating intent data with first command

808
Send first data to voice interface device, first data causing voice interface device to store first data in storage

810
Send, to voice interface device, second data that causes voice interface device to, when voice interface device receives second audio data indicating intent data: query storage for first data; and in response to storage including intent data, cause first command to be utilized

FIG. 8

ON-DEVICE COMMANDS UTILIZING UTTERANCE PATTERNS

BACKGROUND

Internet-of-things devices have become more common in homes and other environments. Control of such devices has become an important consideration. Described herein are improvements in technology and solutions to technical problems that can be used to, among other things, enhance control of internet-of-things devices and related functionality.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a flow diagram of an example process for caching on-device commands utilizing utterance patterns.

DETAILED DESCRIPTION

Figure 1:
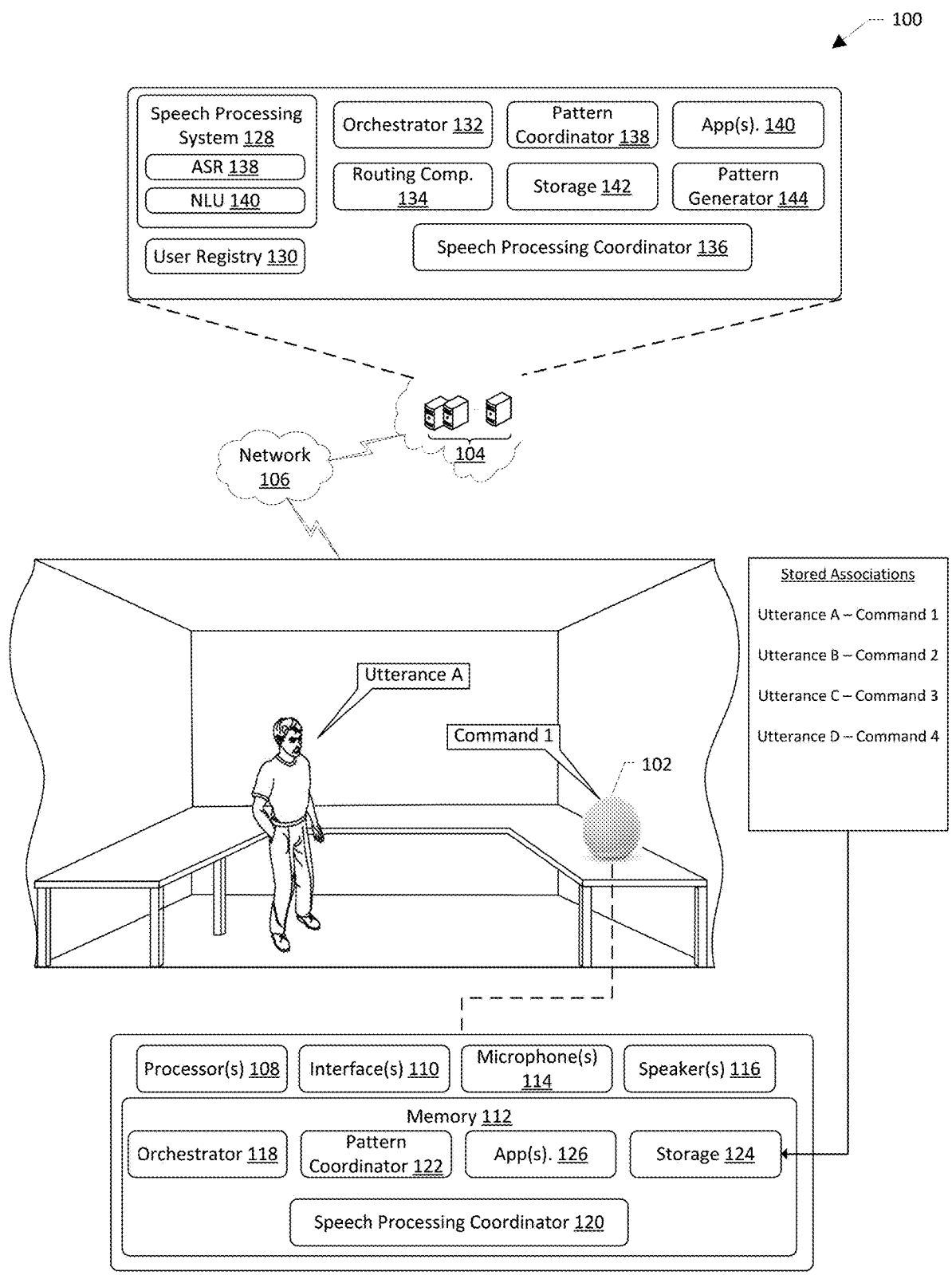
FIG. 1 illustrates a schematic diagram of an example environment for caching on-device commands utilizing utterance patterns.

Systems and methods for caching on-device commands utilizing utterance patterns are disclosed. Take, for example, an environment (such as a home, hotel, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example.

Generally, voice interface devices may be configured with one or more microphones that may be utilized for capturing sound within an environment in which the voice interface devices are situated. The voice interface devices may generate audio data corresponding to the captured sounds and the audio data may be processed. For example, when the audio data represents utterances from one or more users, automatic speech recognition may be utilized to generate text data indicating words of the utterances. Additionally, natural language understanding may be utilized to determine intent data associated with the text data. For example, an utterance may be "turn on the kitchen light." Automatic speech recognition may be utilized to determine the text data "turn on the kitchen light" from generated audio data, and natural language understanding may be utilized to determine that the utterance is associated with a "turn on appliance" intent, with the requested appliance being "kitchen light." It should be understood that speech processing of audio data may include automatic speech recognition and/or natural language understanding, and need not include both. Additionally, in examples, entity recognition may be utilized to generate the intent data as described herein. Additional details on the use of automatic speech recognition, natural language understanding, and entity recognition are provided below.

The intent data, once generated, may then be used to determine a command to be utilized by the voice interface device and/or one or more connected devices to perform an action. Determining the command may be performed by determining one or more applications that are configured to response to the determined intent, calling those applications to determine the appropriate command to provide, and then sending the determined command to the voice interface device and/or the one or more connected devices. In the example provided above, the command may be to cause a connected device with the naming indicator of "kitchen light" to be enabled such that light is emitted from the connected device and/or a light bulb connected to the connected device.

In many examples, the speech processing techniques described above are performed by a speech processing system that is not on the voice interface device. For example, once the voice interface device generates the audio data representing an utterance, the voice interface device sends the audio data to the system for speech processing. In this example, the system may be a robust, distributed system with relatively large amount of computing resources, computing power, and processes for accurately generating the intent data and then determining what command to associate with the intent data. While this process of utilizing a system for at least a portion of the speech processing is likely to lead to an accurate result, some use cases may be improved and/or made available with less resources. To improve efficiency and maybe other things (e.g., latency, privacy, poor network connection, etc.), at least a portion of the speech processing may be performed by the voice interface device being used by the user and/or another device close to the user (e.g., in the same building, on the same network, etc.). For example, the automatic speech recognition and/or the natural language understanding processes may be performed on the voice interface device instead of or in addition to being performed at the system. Additionally, a version of the applications may be generated and sent to the voice interface device to attempt command determination. However, given the size, complexity, and frequently-updated nature of the applications as utilized by the more robust system components, the on-device applications and other system components may have processing, memory, feature, and other limitations.

Described herein are techniques for storing on-device commands utilizing utterance patterns. For example, audio data representing user utterances may be generated over time and commands to perform actions may be determined for those user utterances. For given account data associated with a given voice interface device and/or group of voice interface devices, a pattern generator component of the system may query a data store of historical utterances and their corresponding commands to identify when a given utterance is consistently associated with a given command. It should be understood that in each instance where the pattern generator is discussed herein, that pattern generator and/or the functionality of that pattern generator may be an on-device component and/or may be a part of another system. For example, over a period of time, such as one month, users associated with given account data may provide multiple utterances. Those utterances may include, for example, "tell me the time," "turn on kitchen light," "turn on porch light at 5:00 am," etc. The number of utterances may be in the dozens, hundreds, or more during the period of time. The pattern generator may determine which of these utterances was consistently associated with a given command or other final output from the system in response. Utilizing the example utterances above, the utterance "tell me the time" may have been identified 20 times during the period of time, and while the utterance or other input data was consistently the same, the associated command will differ because the response to the utterance will depend on the time as kept by the voice interface device when the utterance is received. In other words, a first command responsive to the utterance "tell me the time" may be to output audio including "8:00 am," while a second command responsive to the same utterance may be to output audio including "9:00 pm." As such, for these utterances the pattern generator may determine that the associated commands are not consistent.

However, for the utterance "turn on kitchen light," the pattern generator may determine that a consistent command was associated with the utterance (e.g., from a particular input device or more generally from any device). In other words, a first command responsive to the utterance "turn on kitchen light" from any voice user interface device may be to cause a particular smart lightbulb and/or light switch device with the naming indicator of "kitchen light" to change to an "ON" state causing light to be emitted. This output may occur repeatedly, and consistently from this input. Keeping with the example above, the "turn on kitchen light" utterance may be received 25 times during the period of time, and the output command responsive to that utterance may consistently be the same output command and/or may be the same output command at least a threshold number of times and/or at least a threshold percentage of the time, for example. In these examples, the pattern generator may generate pattern data associating data representing the utterance with the output command as a pattern. The system may send this pattern data to the input device and/or other speech processing device(s) for storage on its (or their) on-device memory. For example, a voice interface device may store the command and may receive the pattern data. In other examples, other device(s) associated with the account data may include the command and store the pattern data. The stored data may include one or more patterns determined by the system. It should be understood that when pattern data is discussed herein, that data may be in the form of text data and/or the results of natural language understanding processing along with an indicator of a command associated with the user input at issue. In other examples, the data may be in a format utilizable by the devices to implement a rules-based approach to selecting a command from the on-device storage. In still other examples, finite state transducers may be utilized to select a command when given utterances are received.

Additionally, or alternatively, the pattern generator may utilize utterances and associated commands associated with other account data to determine patterns. For example, in addition to, or instead of, utilizing utterances provided to devices associated with the account data, utterances received at multiple devices associated with other account data may be utilized to identify patterns. By doing so, a more robust dataset may be utilized to determine which utterances utilized by multiple users result in consistently-determined output commands. In these examples, the pattern generator may generate an utterance-to-command or other type of input-to-output pattern as described herein, and then the pattern generator may determine whether the pattern is applicable to given account data. For example, the datastore may be queried to determine if the utterance associated with the pattern has been identified in association with the account data in the past and/or how frequently the utterance has been identified. If the utterance has been previously identified, and/or has been identified at least a threshold number of times, for example, then the pattern data corresponding to the pattern may be sent to one or more devices associated with that account data for storage in the memory.

In examples, the pattern generator may utilize user satisfaction data to determine patterns to be stored on devices. For example, in addition to determining that a command is selected consistently in response to user input, such as an utterance, the system may determine that the selected command is accurate or is otherwise the command intended to be selected by the user. This determination may be based at least in part on user satisfaction data, which may be in the form of audio provided by a user and/or input data, such as input data provided to an application residing on the user's personal device.

Additionally, or alternatively, the pattern generator may be configured to identify a newly-developed functionality and to generate pattern data associated with that functionality. For example, over time, the applications and/or other components for determining what command to associate with given utterances may be updated and/or may be improved to allow for more utterances to be responded to and/or to be responded to more accurately. By way of example, a smart-home application may be configured to determine a command to select for the utterance of "turn on the kitchen light." However, the smart-home application may not, at a given time, be configured to accurately determine a command to select for the utterance of "turn the light blue," because multiple lights might be able to be turned blue and the user might want different lights to turn blue at different times. As another example, functionality for servicing the intent of turning on an appliance with a specific light color may be sufficiently unique for another user account that has only one light capable of turning the color, and it would be advantageous for device(s) associated with that user account to utilize this functionality without the use of system components.

As new functionality is developed or otherwise enabled for the system, the pattern generator may identify what functionality has been newly-developed and may determine whether the new functionality is a good candidate for generating pattern data. Pattern data indicating this utterance-to-command or other type of input-to-output pattern may be generated and may be sent to one or more devices for storage in their respective storages. To determine which of the devices to send the pattern data to, the pattern generator may determine whether one or more attributes of the pattern are associated with attributes of the account data. Utilizing the example above, given account data may indicate that at least one of the connected devices associated with the account data is a light having the capability to change color. This indication may be utilized to determine that the pattern data should be sent to one or more devices associated with the account data. Additional attributes may include, for example, whether a given application such as a smart-home application has been utilized in the past, whether a given device naming indicator is associated with the account data, whether already-stored patterns in a given storage include one or more of the attributes, device types, etc.

Once pattern data is stored in an on-device storage, the voice interface device may utilize the utterance data to quickly identify commands to be selected and utilized for responding to the utterances. For example, an utterance may be captured at the voice interface device and corresponding audio data may be generated. Speech processing may be performed as described herein to determine spoken language data, which may include text data and/or intent data, corresponding to the utterance. An orchestrator of the voice interface device may receive the spoken language data and query a speech processing coordinator of the voice interface device to determine whether the device can handle processing of the spoken language data. For example, if the text data and/or intent data is not determined at a high enough confidence level, the speech processing coordinator may return an indication that the device cannot handle processing of the spoken language data. Additionally, if the spoken language data does not correspond to a pattern stored in the on-device storage and/or does not correspond to a serviceable intent by an application residing on the device, the speech processing coordinator may return an indication that the device cannot handle the processing of the spoken language data. For example, the speech processing coordinator may query a pattern coordinator to determine whether data representing the utterance at issue is present in the storage. If so, the pattern coordinator may return an indication that the utterance is present in the storage and thus the device can handle processing of the spoken language data. If not, the pattern coordinator may query the one or more applications residing on the device to determine if one or more of the applications is configured to respond to the intent indicated by the spoken language data. If so, the pattern coordinator may return an indication that the utterance is serviceable and thus the device can handle processing of the spoken language data. If not, the pattern coordinator may return an indication that the device cannot handle processing of the spoken language data. In these examples, the spoken language data may be sent to the system for processing and/or results of processing by the system may be utilized instead of processing performed by the device.

The orchestrator of the device, in examples where the device is determined to be able to process the spoken language data, may send an execute command to the pattern coordinator requesting that the pattern coordinator identify a command responsive to the utterance. The pattern coordinator may query the storage utilizing data representing the utterance to determine whether the storage includes a pattern associated with the utterance. In examples where the storage includes data representing the utterance, the storage may return results to the pattern coordinator that includes an identifier of the command from the corresponding pattern. The pattern coordinator may then send an indication of the command to one or more other components of the device for generating the command, utilizing the command, and/or sending the command to one or more devices for causing the corresponding action to be performed. By so doing, in these examples, the user utterance may be responded to without the assistance of a system and without requiring an on-device application to perform processing on the data representing the utterance to determine a command that is responsive to the utterance.

In examples where the storage does not include data representing the utterance, the storage may return results to the pattern coordinator that indicates a pattern is not present in the storage for the utterance. The pattern coordinator may then query the one or more applications on the device to determine the command to select for responding to the utterance. For example, for the utterance "turn on kitchen light," at least one of the applications may be configured to respond to intents associated with controlling appliances. The intent data may be utilized to determine that the utterance is associated with a "turn on appliance" intent, and the application configured to respond to that intent may be called. The application may utilize the intent data to determine which device to turn on and/or attributes of the device in question to determine the appropriate command to be utilized. The application may then send an indication of the command to one or more other components of the device for generating the command, utilizing the command, and/or sending the command to one or more devices for causing the corresponding action to be performed.

In addition to the processing performed on the voice interface device as described herein, processing of spoken language data may be performed by the system as well. For example, the spoken language data may be received from the voice interface device at an orchestrator, which may query one or more of a speech processing coordinator of the system and/or a routing component of the system. The speech processing coordinator may be configured to determine whether the utterance associated with the spoken language data is to be processed by the system, the device, and/or both. As described herein, when the device is not able to process the spoken language data, the speech processing coordinator of the system may return results to the orchestrator indicating that the system is to perform the processing. In other examples, the speech processing coordinator of the system may return results to the orchestrator indicating that processing by the device will include the use of the application(s) instead of use of a pattern stored in the on-device storage. In these examples, the system may also process the spoken language data to determine a command responsive to the utterance. The command selected by the system may be compared to the command selected by the device, and when different, command arbitration may be performed to determine which of the commands should be utilized for responding to the utterance. The routing component may be utilized to determine if the system can return results based on the utterance, and the routing component may query the pattern coordinator of the system to determine if results can be returned.

When results can be returned and/or when the speech processing coordinator of the system indicates that the spoken language data should be processed by the system, the orchestrator may send the spoken language data to the pattern coordinator. In some examples, the pattern coordinator of the system may operate in a similar manner as the pattern coordinator of the device. In these examples, the storage may be included in association with the system and that storage may be queried to determine if a pattern is present for the utterance. When a pattern is present, the corresponding command may be returned by the storage and the pattern coordinator may send an indication of the command to other components of the system for generating the command, utilizing the command, and/or sending the command to one or more devices. When a pattern corresponding to the utterance is not present in the storage, the pattern coordinator may query the application(s) configured to respond to the intent associated with the utterance. The application(s) may determine the appropriate command to select and may send an indication of the command to other components of the system for generating the command, utilizing the command, and/or sending the command to one or more devices. As discussed above, data representing the utterance and the selected command may be stored and utilized for determining utterance-to-command patterns. When such patterns are identified as described herein, pattern data may be stored in the storage on the system, and the storage may be synced with the storage on the device. It should be understood that anywhere an utterance-to-command pattern is described, any type of input-to-output pattern may be utilized and need not be associated with a user utterance or response thereto.

In addition to the above, even when pattern data is stored on a storage, subsequent monitoring of patterns may be performed. For example, the spoken language data representing utterances may be processed utilizing the pattern coordinator on the voice interface device as described herein. Additionally, even if not utilized for selecting a command to associate with a particular utterance, the system may also process the spoken language data and select a command. In instances where the command selected utilizing the pattern data diverges from the command selected utilizing the system, the pattern data in the storage may be changed to minimize the divergence. For example, when divergence occurs, and/or when a threshold amount of divergence occurs, new pattern data may be generated associating the utterance with the command from the system. This new pattern data may replace the previous pattern data for the utterance at issue. In other examples, when divergence occurs, and/or when a threshold amount of divergence occurs, the pattern data associated with the utterance may be removed from the storage such that when the utterance is subsequently identified, the storage is not utilized to identify the command to be selected.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for caching on-device commands utilizing utterance patterns. The system 100 may include, for example, one or more devices 102. In certain examples, the devices 102 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102 may be configured to send data to and/or receive data from a system 104, such as via a network 106. It should be understood that where operations are described herein as being performed by the system 104, some or all of those operations may be performed by the devices 102. It should also be understood that anytime the system 104 is referenced, that system may include any system and/or device, whether local to an environment of the devices 102 or otherwise. Additionally, it should be understood that a given space and/or environment may include numerous devices 102. It should also be understood that when a "space" or "environment" is used herein, those terms mean an area and not necessarily a given room, building, or other structure, unless otherwise specifically described as such.

The devices 102 may include one or more components, such as, for example, one or more processors 108, one or more network interfaces 110, memory 112, one or more microphones 114, and/or one or more speakers 116. The microphones 114 may be configured to capture audio, such as user utterances, and generate corresponding audio data. The speakers 116 may be configured to output audio, such as audio corresponding to audio data received from another device and/or the system 104. The devices 102 may also include displays that may be configured to display images corresponding to image data, such as image data received from the system 104 and/or one or more other devices. The memory 112 may include components such as, for example, an orchestrator 118, a speech processing coordinator 120, a pattern coordinator 122, a storage 124, and/or one or more applications 126. Each of these components of the memory 112 will be described in detail below.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 128, a user registry 130, an orchestrator 132, a routing component 134, a speech processing coordinator 136, a pattern coordinator 138, one or more applications 140, a storage 142, and/or a pattern generator 144. It should be understood that while the components of the system 104 are depicted and/or described as separate from each other in FIG. 1, some or all of the components may be a part of the same system. The speech processing system 128 may include an automatic speech recognition component (ASR) 138 and/or a natural language understanding component (NLU) 140. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 140 and/or as determined from user input via a computing device. Skills may be configured to utilize the intent to output data for input to a text-to-speech component, a link or other resource locator for audio data, and/or a command to a device, such as the devices 102. "Skills" may include applications running on devices, such as the devices 102, and/or may include portions that interface with voice user interfaces of devices 102.

In instances where a voice-enabled device is utilized, skills may extend the functionality of devices 102 that can be controlled by users utilizing a voice-user interface. In some examples, skills may be a type of application that may be useable in association with connected devices and may have been developed specifically to work in connection with given connected devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the devices 102 and the system 104 are described in detail below. In examples, some or each of the components of the system 104 may include their own processor(s), network interface(s), and/or memory. As such, by way of example, the speech processing system 128 may include and/or be associated with processor(s), network interface(s), and/or memory. The other components of the system 104, such as the pattern coordinator 138, may include and/or be associated with different processor(s), network interface(s), and/or memory, or one or more of these components may utilize some or all of the same processor(s), network interface(s), and/or memory utilized by the speech processing system 128. These components are described in detail below. Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 130 may be configured to determine and/or generate associations between users, user accounts, environment identifiers, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the devices 102. The user registry 130 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. As described herein, the user registry 130 may be considered a registry of devices for given account data.

The speech-processing system 128 may be configured to receive audio data from the primary devices 102 and/or other devices and perform speech-processing operations. For example, the ASR component 138 may be configured to generate text data corresponding to the audio data, and the NLU component 140 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "order ice cream," the NLU component 140 may identify a "order" intent and the payload may be "ice cream." In this example where the intent data indicates an intent to purchase ice cream to be delivered to an environment, the speech processing system 128 may call one or more applications to effectuate the intent. Speechlets, as described herein may otherwise be described as applications and may include functionality for utilizing intent data to generate directives and/or instructions. For example, an application associated ordering food may be called. The application may be designated as being configured to handle the intent of ordering food, for example. The application may receive the intent data and/or other data associated with the user utterance from the NLU component 140, such as by an orchestrator 132 of the system 104, and may perform operations to place an order for ice cream to be delivered to a given environment, for example. The system 104 may generate audio data confirming that the order has been placed, such as by a text-to-speech component. The audio data may be sent from the system 104 to one or more of the devices 102.

The components of the system 100 are described below by way of example. For example, audio data representing user utterances may be generated over time and commands to perform actions may be determined for those user utterances. For given account data associated with a given voice interface device 102 and/or group of voice interface devices 102, the pattern generator 144 of the system 104 may query a data store of historical utterances and their corresponding commands to identify when a given utterance is consistently associated with a given command. For example, over a period of time, such as one month, users associated with given account data may provide multiple utterances. Those utterances may include, for example, "tell me the time," "turn on kitchen light," "turn on porch light at 5:00 am," etc. The number of utterances may be dozens and/or hundreds, for example, during the period of time. The pattern generator 144 may determine which of these utterances was consistently associated with a given command. Utilizing the example utterances above, the utterance "tell me the time" may have been identified 20 times during the period of time, and while the utterance itself was consistently the same, the associated command will differ because the response to the utterance will depend on the time as kept by the voice interface device 102 when the utterance is received. In other words, a first command responsive to the utterance "tell me the time" may be to output audio including "8:00 am," while a second command responsive to the same utterance may be to output audio including "9:00 pm." As such, for these utterances the pattern generator 144 may determine that the associated commands are not consistent.

However, for the utterance "turn on kitchen light," the pattern generator 144 may determine that a consistent command was associated with the utterance. In other words, a first command responsive to the utterance "turn on kitchen light" may be to cause a device with the naming indicator of "kitchen light" to emit light, while a second command responsive to the same utterance may be to cause the same device to perform the same action. Keeping with the example above, the "turn on kitchen light" utterance may be received 25 times during the period of time, and the command responsive to that utterance may consistently be the same command and/or may be the same command at least a threshold number of times and/or at least a threshold percentage of the time, for example. In these examples, the pattern generator 144 may generate pattern data associating data representing the utterance with the command as a pattern. The system 104 may send this pattern data to the on-device storage 124 of a device 102 associated with the account data. For example, a voice interface device 102 may include the storage 124 and may receive the pattern data. In other examples, other device(s) associated with the account data may include the storage 124 and store the pattern data. The storage 124 may include one or more patterns determined by the system 104.

Additionally, or alternatively, the pattern generator 144 may utilize utterances and associated commands associated with other account data to determine patterns. For example, in addition to, or instead of, utilizing utterances provided to devices 102 associated with the account data, utterances received at multiple devices associated with other account data may be utilized to identify patterns. By doing so, a more robust dataset may be utilized to determine which utterances utilized by multiple users result in consistently-determined commands. In these examples, the pattern generator 144 may generate an utterance-to-command pattern as described herein, and then the pattern generator 144 may determine whether the pattern is applicable to given account data. For example, the datastore may be queried to determine if the utterance associated with the pattern has been identified in association with the account data in the past and/or how frequently the utterance has been identified. If the utterance has been previously identified, and/or has been identified at least a threshold number of times, for example, then the data corresponding to the pattern may be sent to one or more devices 102 associated with that account data for storage in the storage 124.

Additionally, or alternatively, the pattern generator 144 may be configured to identify a newly-developed functionality and to generate pattern data associated with that functionality. For example, over time, the applications 140 and/or other components for determining what command to associate with given utterances may be updated and/or may be improved to allow for more utterances to be responded and/or to be responded to more accurately. By way of example, a smart-home application 140 may be configured to determine a command to select for the utterance of "turn on the kitchen light." However, the smart-home application 140 may not, at a given time, be configured to accurately determine a command to select for the utterance of "turn on the blue kitchen light." At some point, functionality for servicing the intent of turning on an appliance with a specific light color may be developed and utilized by the smart-home application 140 of the system 104. However, it would also be advantageous for devices 102 to also utilize this newly-developed functionality without the use of the system 104. To do so, the pattern generator 144 may identify that the functionality is newly-developed and may determine whether the new functionality is a good candidate for generating pattern data. In this example, the utterance of "turn on the blue kitchen light" will result in a consistent command, namely to cause the device with the naming indicator of "kitchen light" to turn on and the color of the light to be blue. Pattern data indicating this utterance-to-command pattern may be generated and may be sent to one or more devices 102 for storage in their respective storages 124. To determine which of the devices to send the pattern data to, the pattern generator 144 may determine whether one or more attributes of the pattern are associated with attributes of the account data. Utilizing the example above, given account data may indicate that at least one of the connected devices associated with the account data is a light having the capability to change color. This indication may be utilized to determine that the pattern data should be sent to one or more devices 102 associated with the account data. Additional attributes may include, for example, whether a given application 140, such as a smart-home application, has been utilized in the past, whether a given device naming indicator is associated with the account data, whether already-stored patterns in a given storage 124 include one or more of the attributes, device types, etc.

Once pattern data is stored in the on-device storage 124, the voice interface device 102 may utilize the utterance data to quickly identify commands to be selected and utilized for responding to the utterances. For example, an utterance may be captured at the voice interface device 102 and corresponding audio data may be generated. Speech processing may be performed as described herein to determine spoken language data, which may include text data and/or intent data, corresponding to the utterance. The orchestrator 118 of the voice interface device 102 may receive the spoken language data and query the speech processing coordinator 120 of the voice interface device 102 to determine whether the device can handle processing of the spoken language data. For example, if the text data and/or intent data is not determined at a high enough confidence level, the speech processing coordinator 120 may return an indication that the device 102 cannot handle processing of the spoken language data. Additionally, if the spoken language data does not correspond to a pattern stored in the on-device storage 124 and/or does not correspond to a serviceable intent by an application residing on the device 102, the speech processing coordinator 120 may return an indication that the device 102 cannot handle the processing of the spoken language data. For example, the speech processing coordinator 120 may query the pattern coordinator 122 to determine whether data representing the utterance at issue is present in the storage 124. If so, the pattern coordinator 122 may return an indication that the utterance is present in the storage 124 and thus the device 102 can handle processing of the spoken language data. If not, the pattern coordinator 122 may query the one or more applications 126 residing on the device 102 to determine if one or more of the applications 126 is configured to respond to the intent indicated by the spoken language data. If so, the pattern coordinator 122 may return an indication that the utterance is serviceable and thus the device 102 can handle processing of the spoken language data. If not, the pattern coordinator 122 may return an indication that the device 102 cannot handle processing of the spoken language data. In these examples, the spoken language data may be sent to the system 104 for processing and/or results of processing by the system 104 may be utilized instead of processing performed by the device 102.

The orchestrator 118, in examples where the device 102 is determined to be able to process the spoken language data, may send an execute command to the pattern coordinator 122 requesting that the pattern coordinator 122 identify a command responsive to the utterance. The pattern coordinator 122 may query the storage 124 utilizing data representing the utterance to determine whether the storage 124 includes a pattern associated with the utterance. In examples where the storage 124 includes data representing the utterance, the storage 124 may return results to the pattern coordinator 122 that include an identifier of the command from the corresponding pattern. The pattern coordinator 122 may then send an indication of the command to one or more other components of the device 102 for generating the command, utilizing the command, and/or sending the command to one or more devices for causing the corresponding action to be performed. By so doing, in these examples, the user utterance may be responded to without the assistance of the system 104 and without requiring an on-device application 126 to perform processing on the data representing the utterance to determine a command that is responsive to the utterance.

In examples where the storage 124 does not include data representing the utterance, the storage 124 may return results to the pattern coordinator 122 that indicates a pattern is not present in the storage 124 for the utterance. The pattern coordinator 122 may then query the one or more applications 126 to determine the command to select for servicing the utterance. For example, for the utterance "turn on kitchen light," at least one of the applications 126 may be configured to respond to intents associated with controlling appliances. The intent data may be utilized to determine that the utterance is associated with a "turn on appliance" intent, and the application 126 configured to respond to that intent may be called. The application 126 may utilize the intent data to determine which device to turn on and/or attributes of the device in question to determine the appropriate command to be utilized. The application 126 may then send an indication of the command to one or more other components of the device 102 for generating the command, utilizing the command, and/or sending the command to one or more devices for causing the corresponding action to be performed.

In addition to the processing performed on the voice interface device 102 as described herein, processing of spoken language data may be performed by the system 104 as well. For example, the spoken language data may be received from the voice interface device 102 at the orchestrator 132, which may query one or more of speech processing coordinator 136 of the system 104 and/or the routing component 134 of the system 104. The speech processing coordinator 136 may be configured to determine whether the utterance associated with the spoken language data is to be processed by the system 104, the device 102, and/or both. As described herein, when the device 102 is not able to process the spoken language data, the speech processing coordinator 136 of the system 104 may return results to the orchestrator 132 indicating that the system 104 is to perform the processing. In other examples, the speech processing coordinator 136 of the system 104 may return results to the orchestrator 132 indicating that processing by the device 102 will include the use of the application(s) 126 instead of use of a pattern stored in the on-device storage 124. In these examples, the system 104 may also process the spoken language data to determine a command responsive to the utterance. The command selected by the system 104 may be compared to the command selected by the device 102, and when different, command arbitration may be performed to determine which of the commands should be utilized for responding to the utterance. The routing component 134 may be utilized to determine if the system 104 can return results based on the utterance, and the routing component 134 may query the pattern coordinator 138 of the system 104 to determine if results can be returned.

When results can be returned and/or when the speech processing coordinator 136 of the system 104 indicates that the spoken language data should be processed by the system 104, the orchestrator 132 may send the spoken language data to the pattern coordinator 138. In some examples, the pattern coordinator 138 of the system 104 may operate in a similar manner as the pattern coordinator 122 of the device 102. In these examples, a storage 142 may be included in association with the system 104 and that storage 142 may be queried to determine if a pattern is present for the utterance. When a pattern is present, the corresponding command may be returned by the storage 142 and the pattern coordinator 138 may send an indication of the command to other components of the system 104 for generating the command, utilizing the command, and/or sending the command to one or more devices. When a pattern corresponding to the utterance is not present in the storage 142, the pattern coordinator 138 may query the application(s) 140 configured to respond to the intent associated with the utterance. The application(s) 140 may determine the appropriate command to select and may send an indication of the command to other components of the system 104 for generating the command, utilizing the command, and/or sending the command to one or more devices. As discussed above, data representing the utterance and the selected command may be stored and utilized for determining utterance-to-command patterns. When such patterns are identified as described herein, pattern data may be stored in the storage 142 on the system 104, and the storage 142 may be synced with the storage 124 on the device 102.

In addition to the above, even when pattern data is stored on a storage 124, subsequent monitoring of patterns may be performed. For example, the spoken language data representing utterances may be processed utilizing the pattern coordinator 122 on the voice interface device 102 as described herein. Additionally, even if not utilized for selecting a command to associate with a particular utterance, the system 104 may also process the spoken language data and select a command. In instances where the command selected utilizing the pattern data diverges from the command selected utilizing the system 104, the pattern data in the storage 124 may be changed to minimize the divergence. For example, when divergence occurs, and/or when a threshold amount of divergence occurs, new pattern data may be generated associating the utterance with the command from the system 104. This new pattern data may replace the previous pattern data for the utterance at issue. In other examples, when divergence occurs, and/or when a threshold amount of divergence occurs, the pattern data associated with the utterance may be removed from the storage 124 such that when the utterance is subsequently identified, the storage 124 is not utilized to identify the command to be selected.

In addition to the identification of utterance-to-command patterns as described above, one or more machine learning models may be utilized to predict patterns. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with the utterances and corresponding commands. The models may be trained for multiple user accounts and/or for a specific user account. As such, the machine learning models may be configured to learn, without human intervention, attributes of collected utterances and commands that are more likely and/or less likely to be associated and which utterances will correspond to consistently selected commands.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the system 104 and the associated functionality of those components as described herein may be performed by one or more of the devices 102. Additionally, or alternatively, some or all of the components and/or functionalities associated with the devices 102 may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in system 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to an environment associated the devices 102. For instance, the system 104 may be located within one or more of the devices 102. In some instances, some or all of the functionality of the system 104 may be performed by one or more of the devices 102. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
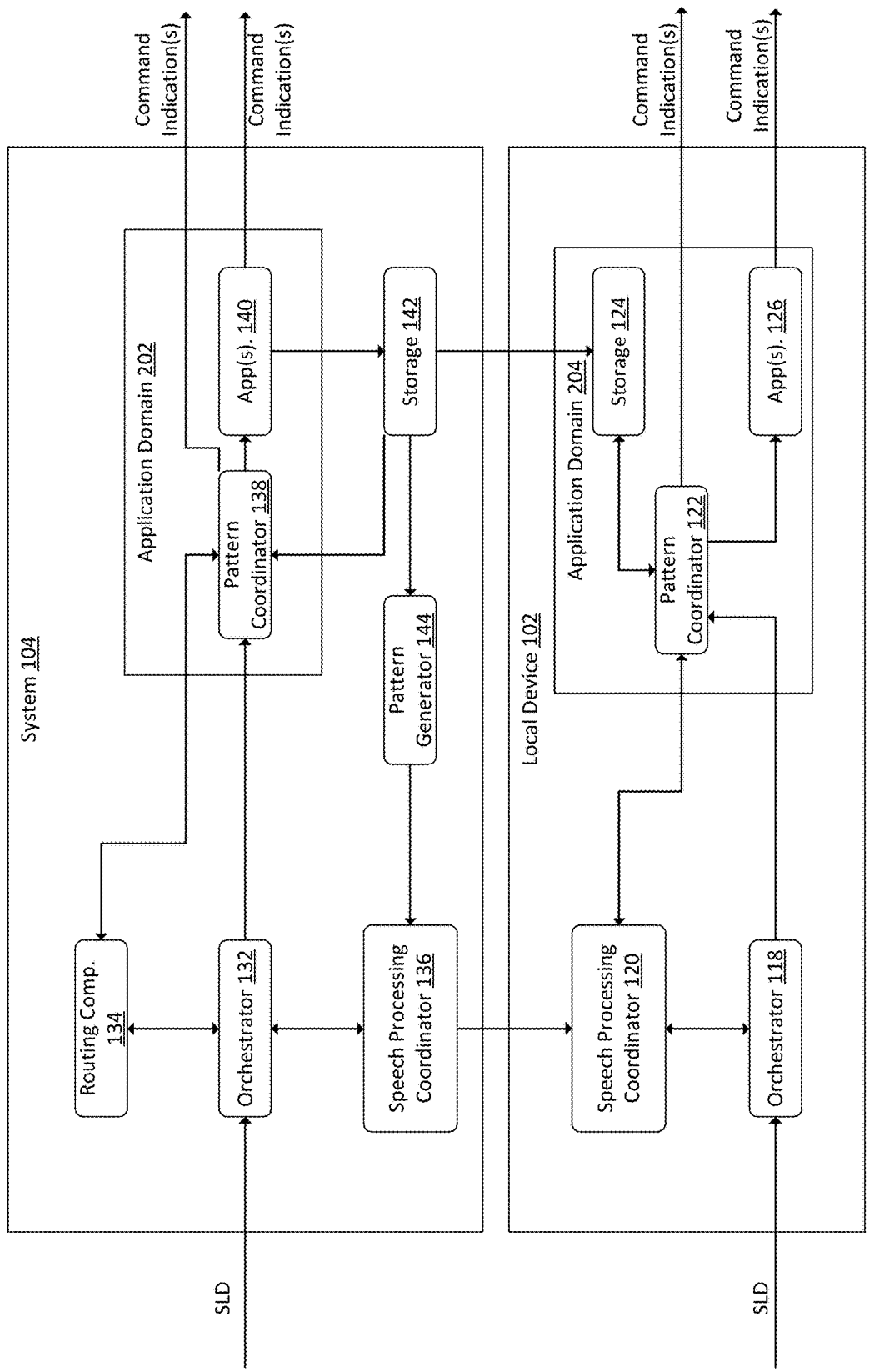
FIG. 2 illustrates a conceptual diagram of example components for caching on-device commands utilizing utterance patterns.

FIG. 2 illustrates a conceptual diagram of example components for caching on-device commands utilizing utterance patterns. FIG. 2 may include some of the same components as described with respect to FIG. 1. For example, FIG. 2 includes a device 102 having an orchestrator 118, a speech processing coordinator 120, a pattern coordinator 122, a storage 124, and/or one or more applications 126. FIG. 2 also includes a system 104 having an orchestrator 132, a routing component 134, a speech processing coordinator 136, a pattern coordinator 138, one or more applications 140, a storage 142, and/or a pattern generator 144. These components may be the same as or similar to the corresponding components discussed in FIG. 1 and/or may perform the same or similar functionality. Processing of spoken language data (SLD as depicted in FIG. 2) is described below utilizing these components.

For example, an utterance may be captured at the voice interface device 102 and corresponding audio data may be generated. Speech processing may be performed as described herein to determine spoken language data, which may include text data and/or intent data, corresponding to the utterance. The orchestrator 118 of the voice interface device 102 may receive the spoken language data and query the speech processing coordinator 120 of the voice interface device 102 to determine whether the device can handle processing of the spoken language data. For example, if the text data and/or intent data is not determined at a high enough confidence level, the speech processing coordinator 120 may return an indication that the device 102 cannot handle processing of the spoken language data. Additionally, if the spoken language data does not correspond to a pattern stored in the on-device storage 124 and/or does not correspond to a serviceable intent by an application residing on the device 102, the speech processing coordinator 120 may return an indication that the device 102 cannot handle the processing of the spoken language data. For example, the speech processing coordinator 120 may query the pattern coordinator 122 to determine whether data representing the utterance at issue is present in the storage 124. If so, the pattern coordinator 122 may return an indication that the utterance is present in the storage 124 and thus the device 102 can handle processing of the spoken language data. If not, the pattern coordinator 122 may query the one or more applications 126 residing on the device 102 to determine if one or more of the applications 126 is configured to respond to the intent indicated by the spoken language data. If so, the pattern coordinator 122 may return an indication that the utterance is serviceable and thus the device 102 can handle processing of the spoken language data. If not, the pattern coordinator 122 may return an indication that the device 102 cannot handle processing of the spoken language data. In these examples, the spoken language data may be sent to the system 104 for processing and/or results of processing by the system 104 may be utilized instead of processing performed by the device 102.

The orchestrator 118, in examples where the device 102 is determined to be able to process the spoken language data, may send an execute command to the pattern coordinator 122 requesting that the pattern coordinator 122 identify a command responsive to the utterance. The pattern coordinator 122 may query the storage 124 utilizing data representing the utterance to determine whether the storage 124 includes a pattern associated with the utterance. In examples where the storage 124 includes data representing the utterance, the storage 124 may return results to the pattern coordinator 122 that include an identifier of the command from the corresponding pattern. The pattern coordinator 122 may then send an indication of the command to one or more other components of the device 102 for generating the command, utilizing the command, and/or sending the command to one or more devices for causing the corresponding action to be performed. By so doing, in these examples, the user utterance may be responded to without the assistance of the system 104 and without requiring an on-device application 126 to perform processing on the data representing the utterance to determine a command that is responsive to the utterance.

In examples where the storage 124 does not include data representing the utterance, the storage 124 may return results to the pattern coordinator 122 that indicates a pattern is not present in the storage 124 for the utterance. The pattern coordinator 122 may then query the one or more applications 126 to determine the command to select for servicing the utterance. For example, for the utterance "turn on kitchen light," at least one of the applications 126 may be configured to respond to intents associated with controlling appliances. The intent data may be utilized to determine that the utterance is associated with a "turn on appliance" intent, and the application 126 configured to respond to that intent may be called. The application 126 may utilize the intent data to determine which device to turn on and/or attributes of the device in question to determine the appropriate command to be utilized. The application 126 may then send an indication of the command to one or more other components of the device 102 for generating the command, utilizing the command, and/or sending the command to one or more devices for causing the corresponding action to be performed.

In addition to the processing performed on the voice interface device 102 as described herein, processing of spoken language data may be performed by the system 104 as well. For example, the spoken language data may be received from the voice interface device 102 at the orchestrator 132, which may query one or more of speech processing coordinator 136 of the system 104 and/or the routing component 134 of the system 104. The speech processing coordinator 136 may be configured to determine whether the utterance associated with the spoken language data is to be processed by the system 104, the device 102, and/or both. As described herein, when the device 102 is not able to process the spoken language data, the speech processing coordinator 136 of the system 104 may return results to the orchestrator 132 indicating that the system 104 is to perform the processing. In other examples, the speech processing coordinator 136 of the system 104 may return results to the orchestrator 132 indicating that processing by the device 102 will include the use of the application(s) 126 instead of use of a pattern stored in the on-device storage 124. In these examples, the system 104 may also process the spoken language data to determine a command responsive to the utterance. The command selected by the system 104 may be compared to the command selected by the device 102, and when different, command arbitration may be performed to determine which of the commands should be utilized for responding to the utterance. The routing component 134 may be utilized to determine if the system 104 can return results based on the utterance, and the routing component 134 may query the pattern coordinator 138 of the system 104 to determine if results can be returned.

When results can be returned and/or when the speech processing coordinator 136 of the system 104 indicates that the spoken language data should be processed by the system 104, the orchestrator 132 may send the spoken language data to the pattern coordinator 138. In some examples, the pattern coordinator 138 of the system 104 may operate in a similar manner as the pattern coordinator 122 of the device 102. In these examples, the storage 142 may be included in association with the system 104 and that storage 142 may be queried to determine if a pattern is present for the utterance. When a pattern is present, the corresponding command may be returned by the storage 142 and the pattern coordinator 138 may send an indication of the command to other components of the system 104 for generating the command, utilizing the command, and/or sending the command to one or more devices. When a pattern corresponding to the utterance is not present in the storage 142, the pattern coordinator 138 may query the application(s) 140 configured to respond to the intent associated with the utterance. The application(s) 140 may determine the appropriate command to select and may send an indication of the command to other components of the system 104 for generating the command, utilizing the command, and/or sending the command to one or more devices. As discussed above, data representing the utterance and the selected command may be stored and utilized for determining utterance-to-command patterns. When such patterns are identified as described herein, pattern data may be stored in the storage 142 on the system 104, and the storage 142 may be synced with the storage 124 on the device 102.

Figure 3:
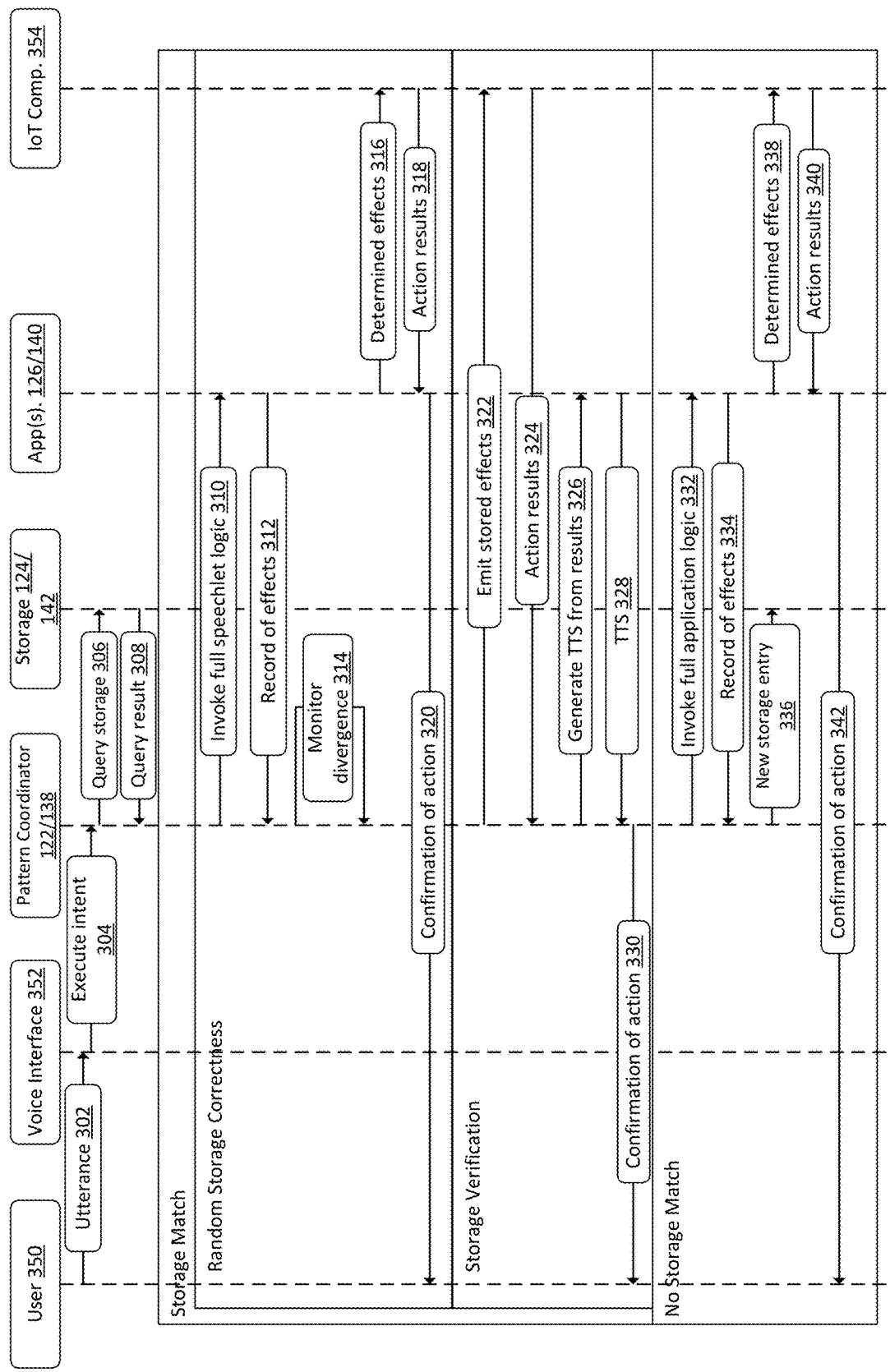
FIG. 3 illustrates a sequence diagram of an example process for caching on-device commands utilizing utterance patterns.

FIG. 3 illustrates a sequence diagram of an example process for caching on-device commands utilizing utterance patterns. It should be understood that the example processes described in FIG. 3 are provided in an illustrative order, but that the processes may be performed in other orders and/or in parallel.

At block 302, a user 350 may provide an utterance to a voice interface device having a voice interface 352. For example, a user may speak an utterance while near a voice interface device. The voice interface device may include one or more microphones that may capture audio representing the utterance and generate corresponding audio data.

At block 304, the voice interface 352 may send an execute intent instruction to a pattern coordinator 138. For example, ASR and/or NLU processing as described herein may be performed on the audio data to generate text data and/or intent data, which collectively may be referred to as spoken language data. Once spoken language data is generated and is utilizable to determine a response to the utterance, the voice interface 352 may send the execute intent instruction to the pattern coordinator 138, indicating that processing is to be performed to select a command in response to the utterance.

At block 306, the pattern coordinator 138 may query the storage 142 for pattern data associated with the utterance. For example, data representing the utterance may be utilized to determine if the storage 142 includes pattern data indicating an utterance-to-command pattern for the utterance at issue.

At block 308, the storage 142 may return results to the pattern coordinator 138. The results may indicate that the storage 142 includes pattern data representing an utterance-to-command pattern for the utterance at issue. The results may alternatively indicate that the storage 142 does not include such pattern data.

In instances where the results from the storage 142 indicate a match between the utterance at issue and an utterance stored in the storage 142, but the match is determined to be random or otherwise is not verified, then at block 310 the pattern coordinator 138 may call the application(s) 140 to invoke fully application logic for servicing the intent associated with the utterance. In these examples, since the stored pattern data cannot be utilized to accurately determine the command to be selected from the utterance at issue, processing may instead utilize one or more applications 140 to select the appropriate command, as described herein.

At block 312, the applications 140 may record the effects of processing the intent data and provide data representing those effects to the pattern coordinator 138. The effects of processing the intent data may include the selected command, identifiers of devices associated with the command, generated directives, and/or any other information associated with processing by the applications 140.

At block 314, the pattern coordinator 138 may monitor for divergence between effects produced from processing the utterance at the device 102 and effects produced from processing the utterance at the system 104. For example, when the device 102 attempts to process the utterance, such as by utilizing one or more applications as described herein, the device 102 may select a given command that is responsive to the utterance. That device-selected command may be compared to the command determined by the one or more applications to determine if the two commands diverge. This information may be stored and utilized for generating pattern data and/or removing pattern data as described herein.

At block 316, the applications 140 may send the determined effects to an Internet-of-Things (IoT) component 354. The IoT component 354 may be utilized to retrieve information associated with IoT devices and/or systems available to the account data at issue and to determine what devices will be operated based on the determined effects.

At block 318, the IoT component 354 may send action results to the application(s) 140. The action results may include the command itself and/or information needed to generate the command.

At block 320, the application(s) 140 may send confirmation of the action to the user 350, which may be in the form of audio provided to the user 350 via the voice interface device 102. For example, the command may be executed and then audio confirming execution of the command in response to the utterance may be output on the voice interface device 102 and/or another device associated with the user 350. Other forms of confirmation may also be presented, such as in the form of audible sounds, through a graphical user interface, etc.

Returning to block 308, in examples where the stored results indicate an utterance match to a pattern stored in the storage 142 and the stored results are verified, at block 322 the pattern coordinator 138 may emit the stored effects to the IoT component 354. In this example, the pattern data indicated that an utterance-to-command pattern associated with the utterance at issue was stored in the storage 142 and therefore the command may be utilized in response to the utterance. By so doing, the use of the applications 140 is skipped.

At block 324, the IoT component 354 may send action results to the pattern coordinator 138. The sending of action results may be performed in the same or a similar manner as described with respect to block 318.

At block 326, the pattern coordinator 138 may request the application(s) 140 to generate text-to-speech (TTS) results from the results as provided by the IoT component 354. For example, the command may cause an action associated with the command to be performed and confirmation of performance of the action may be sent to the user 350. To do so, the application(s) 140 may be called to generate the TTS results for an audible confirmation.

At block 328, the application(s) 140 may send the TTS results to the pattern coordinator 138. For example, the results of the TTS processing may include generation and/or identification of audio data representing an audible response to the utterance indicating the confirmation.

At block 330, the pattern coordinator 138 may utilize the TTS results to send confirmation of the action to the user 350, which may be in the form of audio provided to the user 350 via the voice interface device 102. Sending of the confirmation may be performed in the same or a similar manner as described with respect to block 320.

Returning again to block 308, in examples where no storage match is indicated, at block 332 the pattern coordinator 138 may send a query to the application(s) 140 to invoke fully application logic. The sending of the query may be performed in the same or a similar manner as described above with respect to block 310.

At block 334, the application(s) 140 may record the resulting effects from processing of the utterance and may send the effects to the pattern coordinator 138. Recording of the resulting effects may be performed in the same or a similar manner as described above with respect to block 312.

At block 336, when the effects indicate consistent utterance-to-command selection, a new storage entry for a new utterance-to-command pattern may be generated and sent to the storage 142. Generation of the new storage entry may be performed when analysis of command selection based on an utterance indicates consistent command selection, as described in more detail elsewhere herein.

At block 338, the application(s) 140 may send the determined effects to the IoT component 354. Sending the determined effects may be performed in the same or a similar manner as described above with respect to block 316.

At block 340, the IoT component 354 may send action results to the application(s) 140. Sending the action results may be performed in the same or a similar manner as described above with respect to block 318.

At block 342, the application(s) 140 may send confirmation of the action to the user 350, which may be in the form of audio provided to the user 350 via the voice interface device 102. The sending of the confirmation may be performed in the same or a similar manner as described above with respect to block 320.

FIGS. 4-9 illustrates processes for caching on-device commands utilizing utterance patterns. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, 10, and 11, although the processes may be implemented in a wide variety of other environments, architectures and systems.

Figure 4:
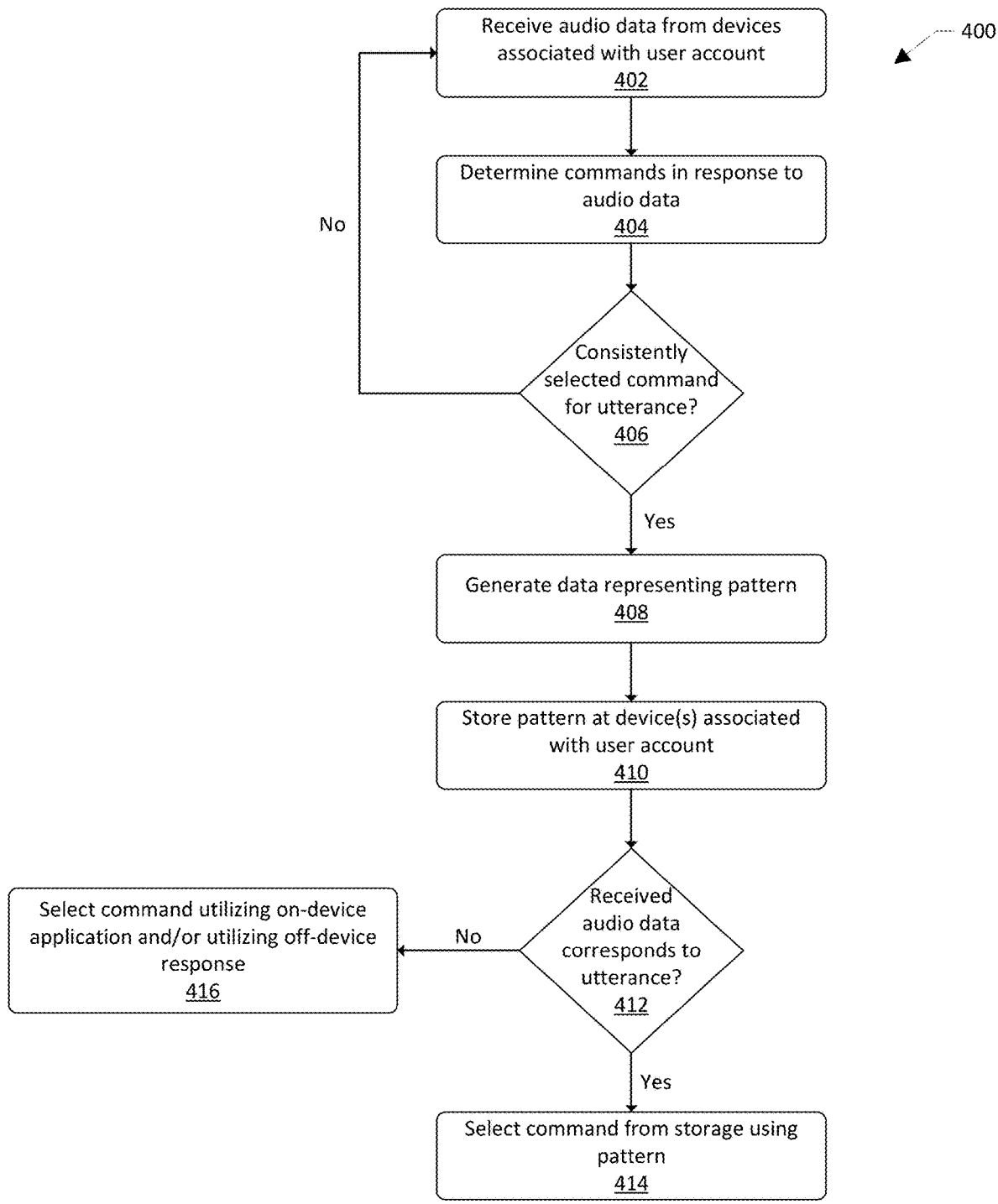
FIG. 4 illustrates a flow diagram of an example process for identifying stable utterance-to-command patterns associated with account data for caching on-device commands.

FIG. 4 illustrates a flow diagram of an example process 400 for identifying stable utterance-to-command patterns associated with account data for caching on-device commands. The order in which the operations or steps are described is not intended to be construed as a limitation, and any number of the described operations may be combined in any order and/or in parallel to implement process 400.

At block 402, the process 400 may include receiving audio data from one or more devices associated with a user account over time. For example, audio data representing user utterances may be generated over time and commands to perform actions may be determined for those user utterances. For given account data associated with a given voice interface device and/or group of voice interface devices, a pattern generator of the system may query a data store of historical utterances and their corresponding commands to identify when a given utterance is consistently associated with a given command. For example, over a period of time, such as one month, users associated with given account data may provide multiple utterances. Those utterances may include, for example, "tell me the time," "turn on kitchen light," "turn on porch light at 5:00 am," etc. The number of utterances may be dozens and/or hundreds during the period of time.

At block 404, the process 400 may include determining commands in response to the audio data. Similar to the utterances, for some or all of the utterances, a command responsive to the utterance may be determined and stored in the datastore.

At block 406, the process 400 may include determining whether there is a consistent command for a given utterance over time. For example, the pattern generator may determine which of these utterances was consistently associated with a given command. Utilizing the example utterances above, the utterance "tell me the time" may have been identified 20 times during the period of time, and while the utterance itself was consistently the same, the associated command will differ because the response to the utterance will depend on the time as kept by the voice interface device when the utterance is received. In other words, a first command responsive to the utterance "tell me the time" may be to output audio including "8:00 am," while a second command responsive to the same utterance may be to output audio including "9:00 pm." As such, for these utterances the pattern generator may determine that the associated commands are not consistent.

However, for the utterance "turn on kitchen light," the pattern generator may determine that a consistent command was associated with the utterance. In other words, a first command responsive to the utterance "turn on kitchen light" may be to cause a device with the naming indicator of "kitchen light" to emit light, while a second command responsive to the same utterance may be to cause the same device to perform the same action. Keeping with the example above, the "turn on kitchen light" utterance may be received 25 times during the period of time, and the command responsive to that utterance may consistently be the same command and/or may be the same command at least a threshold number of times and/or at least a threshold percentage of the time, for example. In these examples, the pattern generator may generate pattern data associating data representing the utterance with the command as a pattern. The system may send this pattern data to an on-device storage of a device associated with the account data. For example, a voice interface device may include the storage and may receive the pattern data. In other examples, other device(s) associated with the account data may include the storage and store the pattern data. The storage may include one or more patterns determined by the system.

In examples where there is not a consistent command for the given utterance over time, then the process 400 may return to block 402 where additional audio data representing additional utterances may be received. In this example, a consistent command was not determined to apply to a given utterance and therefore the utterance is determined to not be a good candidate for inclusion in the utterance-to-command patterns.

In examples where there is a consistent command of the given utterance over time, then the process 400, at block 408, may include generating data representing an utterance-to-command pattern. This pattern data may associate data representing the utterance with an identifier of the command.

At block 410, the process 400 may include caching the pattern data at the one or more devices associated with the user account. For example, the pattern data may be sent to the one or more devices, which may store the pattern data in on-device storages to be utilized for selecting commands associated with the utterances indicated in the pattern data.

At block 412, the process 400 may include determining whether received audio data corresponds to the utterance. For example, subsequent to when the pattern data is stored in the storage, a user may provide an utterance, which may be captured by the voice interface device(s) and corresponding audio data may be generated. Speech processing may be performed on the audio data to determine text data and/or intent data representing the utterance. The pattern coordinator may query the storage to determine if data representing the utterance at issue is included in the storage.

In examples where the received audio data corresponds to the utterance, then at block 400, the process 414 may include selecting the command indicated by the pattern data. In these examples, the pattern data stored in the storage indicates that a pattern is present in the storage for the utterance at issue. In these examples, the storage may return an identifier of the command for use in generating, utilizing, and/or sending the command in response to the utterance.

In examples where the received audio data does not correspond to the utterance, then at block 400, the process 416 may include selecting a command utilizing an on-device application and/or utilizing an off-device application response. In these examples, the data representing the utterance at issue was not present in the storage and therefore the pattern data could not be utilized to select a command responsive to the utterance. Instead, on-device applications and/or off-device applications may be utilized to determine the command to select.

Figure 5:
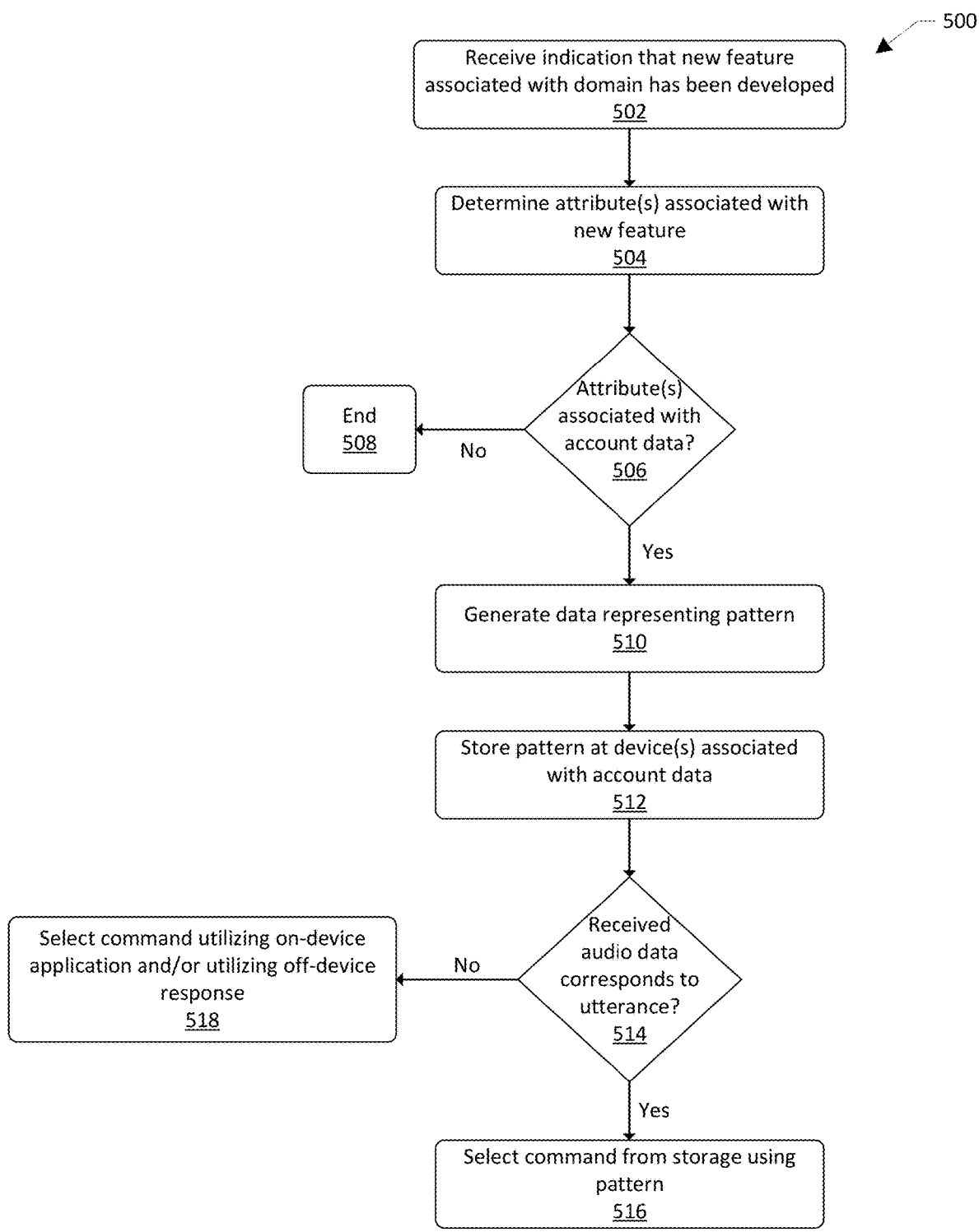
FIG. 5 illustrates a flow diagram of an example process for identifying a newly-developed functionality and generating an utterance-to-command pattern associated with the newly-developed functionality.

FIG. 5 illustrates a flow diagram of an example process 500 for identifying a newly-developed functionality and generating an utterance-to-command pattern associated with the newly-developed functionality. The order in which the operations or steps are described is not intended to be construed as a limitation, and any number of the described operations may be combined in any order and/or in parallel to implement process 500.

At block 502, the process 500 may include receiving an indication that a new feature associated with an application type has been developed. For example, over time, the applications and/or other components for determining what command to associate with given utterances may be updated and/or may be improved to allow for more utterances to be responded to and/or to be responded to more accurately. By way of example, a smart-home application may be configured to determine a command to select for the utterance of "turn on the kitchen light." However, the smart-home application may not, at a given time, be configured to accurately determine a command to select for the utterance of "turn on the blue kitchen light." At some point, functionality for servicing the intent of turning on an appliance with a specific light color may be developed and utilized by the smart-home application of the system. However, it would also be advantageous for devices to also utilize this newly-developed functionality without the use of the system. To do so, the pattern generator may identify that the functionality is newly-developed and may determine whether the new functionality is a good candidate for generating pattern data. In this example, the utterance of "turn on the blue kitchen light" will result in a consistent command, namely to cause the device with the naming indicator of "kitchen light" to turn on and the color of the light to be blue. Pattern data indicating this utterance-to-command pattern may be generated and may be sent to one or more devices for storage in their respective storages.

At block 504, the process 500 may include determining one or more attributes associated with the new feature. For example, to determine which of the devices to send the pattern data to, the pattern generator may determine whether one or more attributes of the pattern are associated with attributes of the account data. Utilizing the example above, given account data may indicate that at least one of the connected devices associated with the account data is a light having the capability to change color. This indication may be utilized to determine that the pattern data should be sent to one or more devices associated with the account data. Additional attributes may include, for example, whether a given application, such as a smart-home application, has been utilized in the past, whether a given device naming indicator is associated with the account data, whether already-stored patterns in a given storage include one or more of the attributes, device types, etc.

At block 506, the process 500 may include determining whether the one or more attributes are associated with given account data. For example, a comparison of the attributes associated with the newly-developed feature may be compared to attributes indicated in the account data for a given user account.

In examples where at least one of the one or more attributes are not associated with the given account data, the process 500 may end at block 508. In these examples, it may be determined that the account data at issue is unlikely to utilize the application type with which the new feature is associated and/or to have a user provide a user utterance that may invoke the new feature. As such, the system may refrain from sending pattern data associated with the new feature to a storage associated with device for the account data.

In examples where at least one of the one or more attributes are associated with the given account data, the process 500 may include, at block 510, generating data representing an utterance-to-command pattern associated with the new feature. This pattern data may associate data representing the utterance with an identifier of the command.

At block 512, the process 500 may include caching the pattern data at one or more devices associated with the account data. For example, the pattern data may be sent to the one or more devices, which may store the pattern data in on-device storages to be utilized for selecting commands associated with the utterances indicated in the pattern data.

At block 514, the process 500 may include determining whether received audio data corresponds to the utterance. For example, subsequent to when the pattern data is stored in the storage, a user may provide an utterance, which may be captured by the voice interface device(s) and corresponding audio data may be generated. Speech processing may be performed on the audio data to determine text data and/or intent data representing the utterance. The pattern coordinator may query the storage to determine if data representing the utterance at issue is included in the storage.

In examples where the received audio data corresponds to the utterance, then at block 500, the process 516 may include selecting the command indicated by the pattern data. In these examples, the pattern data stored in the storage indicates that a pattern is present in the storage for the utterance at issue. In these examples, the storage may return an identifier of the command for use in generating, utilizing, and/or sending the command in response to the utterance.

In examples where the received audio data does not correspond to the utterance, then at block 500, the process 518 may include selecting a command utilizing an on-device application and/or utilizing an off-device application response. In these examples, the data representing the utterance at issue was not present in the storage and therefore the pattern data could not be utilized to select a command responsive to the utterance. Instead, on-device applications and/or off-device applications may be utilized to determine the command to select.

Figure 6:
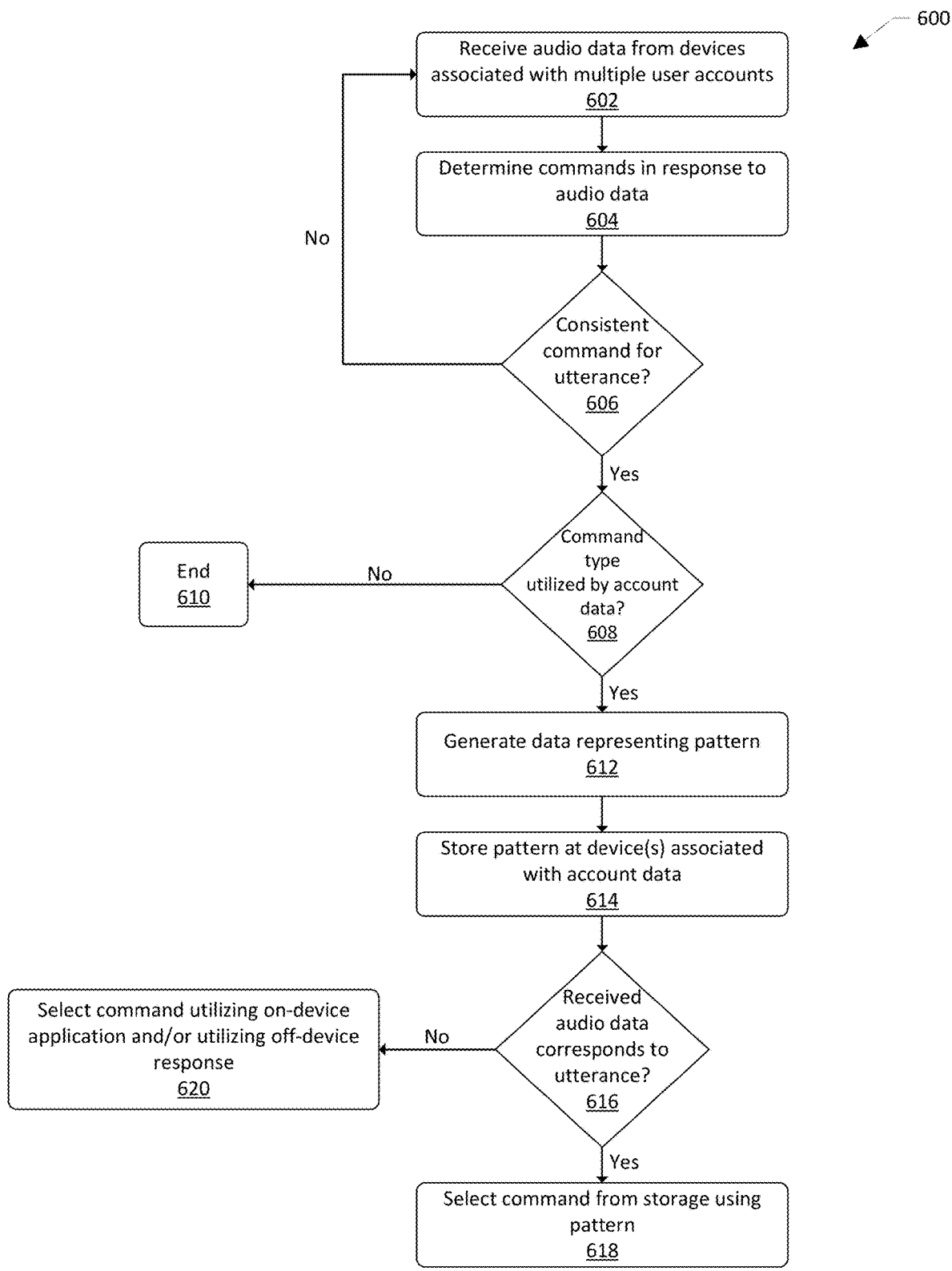
FIG. 6 illustrates a flow diagram of an example process for identifying stable utterance-to-command patterns across user accounts.

FIG. 6 illustrates a flow diagram of an example process 600 for identifying stable utterance-to-command patterns across user accounts. The order in which the operations or steps are described is not intended to be construed as a limitation, and any number of the described operations may be combined in any order and/or in parallel to implement process 600.

At block 602, the process 600 may include receiving audio data from one or more devices associated with multiple user accounts. For example, audio data representing user utterances may be generated over time and commands to perform actions may be determined for those user utterances. For given account data associated with a given voice interface device and/or group of voice interface devices, a pattern generator of the system may query a data store of historical utterances and their corresponding commands to identify when a given utterance is consistently associated with a given command. For example, over a period of time, such as one month, users associated with given account data may provide multiple utterances. Those utterances may include, for example, "tell me the time," "turn on kitchen light," "turn on porch light at 5:00 am," etc. The number of utterances may be dozens and/or hundreds during the period of time.

In this example, in addition to, or instead of, utilizing utterances provided to devices associated with the account data, utterances received at multiple devices associated with other account data may be utilized to identify patterns. By doing so, a more robust dataset may be utilized to determine which utterances utilized by multiple users result in consistently-determined commands. In these examples, the pattern generator may generate an utterance-to-command pattern as described herein, and then the pattern generator may determine whether the pattern is applicable to given account data. For example, the datastore may be queried to determine if the utterance associated with the pattern has been identified in association with the account data in the past and/or how frequently the utterance has been identified. If the utterance has been previously identified, and/or has been identified at least a threshold number of times, for example, then the data corresponding to the pattern may be sent to one or more devices associated with that account data for storage in the storage.

At block 604, the process 600 may include determining commands in response to the audio data. Similar to the utterances, for some or all of the utterances, a command responsive to the utterance may be determined and stored in the datastore.

At block 606, the process 600 may include determining whether there is a consistent command for a given utterance over time. For example, the pattern generator may determine which of these utterances was consistently associated with a given command. Utilizing the example utterances above, the utterance "tell me the time" may have been identified 20 times during the period of time, and while the utterance itself was consistently the same, the associated command will differ because the response to the utterance will depend on the time as kept by the voice interface device when the utterance is received. In other words, a first command responsive to the utterance "tell me the time" may be to output audio including "8:00 am," while a second command responsive to the same utterance may be to output audio including "9:00 pm." As such, for these utterances the pattern generator may determine that the associated commands are not consistent.

However, for the utterance "turn on kitchen light," the pattern generator may determine that a consistent command was associated with the utterance. In other words, a first command responsive to the utterance "turn on kitchen light" may be to cause a device with the naming indicator of "kitchen light" to emit light, while a second command responsive to the same utterance may be to cause the same device to perform the same action. Keeping with the example above, the "turn on kitchen light" utterance may be received 25 times during the period of time, and the command responsive to that utterance may consistently be the same command and/or may be the same command at least a threshold number of times and/or at least a threshold percentage of the time, for example.

In examples where there is not a consistent command for the given utterance over time, then the process 600 may return to block 602 where additional audio data representing additional utterances may be received. In this example, a consistent command was not determined to apply to a given utterance and therefore the utterance is determined to not be a good candidate for inclusion in the utterance-to-command patterns.

At block 608, the process 600 may include determining whether the application type associated with the command is utilized by given account data.

In examples where the application type is not utilized by the given account data, the process 600 may end at block 610. In these examples, while an utterance-to-command pattern was identified in association with multiple accounts, the account at issue is unlikely to utilize the pattern because the account has not utilized the application type at issue. As such, the system may refrain from sending pattern data associated with the utterance-to-command pattern to the storage of devices associated with the user account.

In examples where the application type is utilized by the given account data, the process 600 may include, at block 612, generating data representing the pattern. This pattern data may associate data representing the utterance with an identifier of the command.

At block 614 the process 600 may include caching the pattern data at one or more devices associated with the account data. For example, the pattern data may be sent to the one or more devices, which may store the pattern data in on-device storages to be utilized for selecting commands associated with the utterances indicated in the pattern data.

At block 616, the process 600 may include determining whether received audio data corresponds to the utterance. For example, subsequent to when the pattern data is stored in the storage, a user may provide an utterance, which may be captured by the voice interface device(s) and corresponding audio data may be generated. Speech processing may be performed on the audio data to determine text data and/or intent data representing the utterance. The pattern coordinator may query the storage to determine if data representing the utterance at issue is included in the storage.

In examples where the received audio data corresponds to the utterance, then at block 600, the process 618 may include selecting the command indicated by the pattern data. In these examples, the pattern data stored in the storage indicates that a pattern is present in the storage for the utterance at issue. In these examples, the storage may return an identifier of the command for use in generating, utilizing, and/or sending the command in response to the utterance.

In examples where the received audio data does not correspond to the utterance, then at block 600, the process 620 may include selecting a command utilizing an on-device application and/or utilizing an off-device response. In these examples, the data representing the utterance at issue was not present in the storage and therefore the pattern data could not be utilized to select a command responsive to the utterance. Instead, on-device applications and/or off-device applications may be utilized to determine the command to select.

Figure 7:
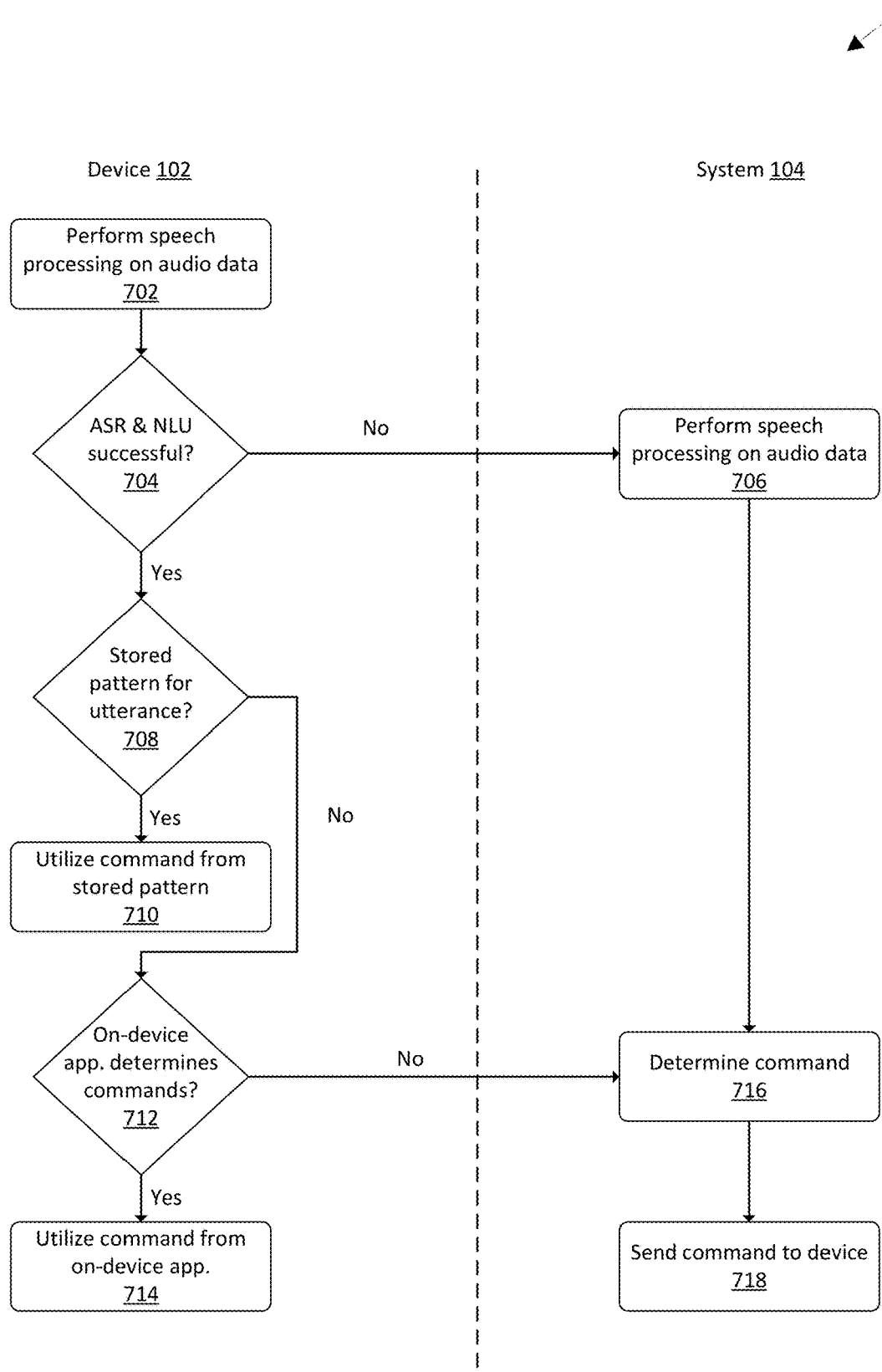
FIG. 7 illustrates a flow diagram of an example process showing runtime utilization of on-device and/or off-device processes to respond to a user utterance.

FIG. 7 illustrates a flow diagram of an example process 700 showing runtime utilization of on-device and/or off-device processes to respond to a user utterance. The order in which the operations or steps are described is not intended to be construed as a limitation, and any number of the described operations may be combined in any order and/or in parallel to implement process 700.

At block 702, the process 700 may include a device 102 performing speech processing on audio data. For example, automatic speech recognition and/or natural language understanding processes may be performed on the device 102 instead of or in addition to being performed at the system 104.

At block 704, the process 700 may include the device 102 determining whether ASR and/or NLU processing was successful. For example, the speech processing performed on the device 102 may utilize versions of models and/or processes that require less computing power than those utilized by the system 104, but with less accurate results at least in some circumstances. As such, processing of the audio data on the device 102 may lead to successful generation of text data and/or intent data in many, but perhaps not all, circumstances.

In instances where the ASR and/or NLU processing was not successful, the process 700 may include, at block 706, the system 104 performing speech processing on the audio data. In this example, it may be determined that the processing power and processes offered by the more robust system 104 are needed to perform speech processing on the audio data. In this example, since processing transitions to the system 104, determination of a command in response to the utterance at issue may also be performed at the system 104, as described below.

In instances where the ASR and NLU processing was successful, the process 700 may include, at block 708, determining whether a storage associated with the device 102 includes a pattern associated with the utterance. For example, a pattern coordinator may query the storage to determine if data representing the utterance at issue is included in the storage.

In instances where the storage includes a pattern associated with the utterance, the process 700 may include, at block 710, utilizing the command indicated by the pattern in response to the utterance. For example, the command indicated by the pattern may be utilized to select the command in response to the utterance.

In instances where the storage does not include a pattern associated with the utterance, the process 700 may include, at block 712, determining whether an on-device application has determined a command in response to the utterance. In these examples, the data representing the utterance at issue was not present in the storage and therefore the pattern data could not be utilized to select a command responsive to the utterance. Instead, on-device applications may be queried to determine the command to select.

In instances where the on-device application has determined a command in response to the utterance, the process 700 may include, at block 714, utilizing the command determined from the on-device application. In these examples, the application residing on the device 102 may have determined the command to respond to the utterance, such as to at least a threshold degree of confidence.

In instances where the on-device application has not determined the command, the process 700 may include, at block 716, the system 104 determining the command. The system 104 may also determine the command in instances where the system 104 processes the audio data as described with respect to block 706. For example, an application may be called to respond to the intent data at issue and to determine a command to select in response to the utterance.

At block 718, the process 700 may include the system 104 sending the command to the device 102 and/or to another device for performance of a corresponding action. For example, depending on the command at issue, the command may be sent to the device 102 and/or to other devices to cause those devices to take an action responsive to the utterance. Output of a confirmation may also be performed, such as through an audible or visual indication that the action has been performed in response to the utterance.

FIG. 8 illustrates a flow diagram of an example process 800 for caching on-device commands utilizing utterance patterns. The order in which the operations or steps are described is not intended to be construed as a limitation, and any number of the described operations may be combined in any order and/or in parallel to implement process 800.

At block 802, the process 800 may include receiving, over a period of time, first audio data representing multiple utterances received at a voice interface device associated with account data, the utterances requesting an action to be performed by a first device associated with the voice interface device. For example, audio data representing user utterances may be generated over time and commands to perform actions may be determined for those user utterances. For given account data associated with a given voice interface device and/or group of voice interface devices, a pattern generator of the system may query a data store of historical utterances and their corresponding commands to identify when a given utterance is consistently associated with a given command. For example, over a period of time, such as one month, users associated with given account data may provide multiple utterances. Those utterances may include, for example, "tell me the time," "turn on kitchen light," "turn on porch light at 5:00 am," etc. The number of utterances may be dozens and/or hundreds during the period of time.

At block 804, the process 800 may include determining that the first audio data over the period of time resulted in selection of a first command to perform the action being sent to the voice interface device, the determining indicating selection of the first command repeatedly. For example, a pattern generator may determine which of these utterances was consistently associated with a given command. Utilizing the example utterances above, the utterance "tell me the time" may have been identified 20 times during the period of time, and while the utterance itself was consistently the same, the associated command will differ because the response to the utterance will depend on the time as kept by the voice interface device when the utterance is received. In other words, a first command responsive to the utterance "tell me the time" may be to output audio including "8:00 am," while a second command responsive to the same utterance may be to output audio including "9:00 pm." As such, for these utterances the pattern generator may determine that the associated commands are not consistent.

However, for the utterance "turn on kitchen light," the pattern generator may determine that a consistent command was associated with the utterance. In other words, a first command responsive to the utterance "turn on kitchen light" may be to cause a device with the naming indicator of "kitchen light" to emit light, while a second command responsive to the same utterance may be to cause the same device to perform the same action. Keeping with the example above, the "turn on kitchen light" utterance may be received 25 times during the period of time, and the command responsive to that utterance may consistently be the same command and/or may be the same command at least a threshold number of times and/or at least a threshold percentage of the time, for example.

At block 806, the process 800 may include generating, in response to determining that the first command was selected repeatedly, first data associating intent data with the first command. For example, pattern data may be generated indicating an association between the data representing the utterance and the command.

At block 808, the process 800 may include sending the first data to the voice interface device, the first data causing the voice interface device to store the first data in a storage. For example, the voice interface device may include a storage configured to store the pattern data and to retrieve the pattern data when queried to do so.

At block 810, the process 800 may include sending, to the voice interface device, second data that causes the voice interface device to, when the voice interface device receives second audio data indicating the intent data: query the storage for the first data; and in response to the storage including the intent data, cause the first command to be utilized. For example, when the device processes audio data representing an utterance, the storage may be queried to determine if the determined utterance is present in the storage. In instances where the utterance is present, the storage may return results indicating the associated command, which may be utilized in response to the utterance.

Additionally, or alternatively, the process 800 may include identifying, after the first data is generated, a feature developed in association with the category of commands. The process 800 may also include generating third data associating reference intent data with a second command associated with the feature. The process 800 may also include determining that the account data indicates prior utilization of the category of commands. The process 800 may also include, in response to the account data indicating prior utilization of the category of commands, sending the third data to the voice interface device, the third data causing the voice interface device to store the third data in the storage.

Additionally, or alternatively, the process 800 may include receiving an indication that processing of third audio data representing the utterance failed on the voice interface device. The process 800 may also include determining the first data representing the utterance from the third audio data. The process 800 may also include querying, in response to receiving the indication, the storage as stored on the system for the intent data. The process 800 may also include receiving, from the storage as stored on the system, response data indicating the first command is associated with the intent data. The process 800 may also include sending, in response to the intent data being associated with the first command in the storage as stored on the system, the command to the voice interface device.

Additionally, or alternatively, the process 800 may include determining, from multiple user accounts, that processing of third audio data resulted in a consistent selection of a second command to operate devices having a device type. The process 800 may also include generating third data associating an utterance with the second command. The process 800 may also include determining, from the account data, that the voice interface device is associated with a second device having the device type. The process 800 may also include sending the third data to the voice interface device in response to determining the voice interface device is associated with the second device having the device type, the third data causing the voice interface device to store the second data in the storage.

Figure 9:
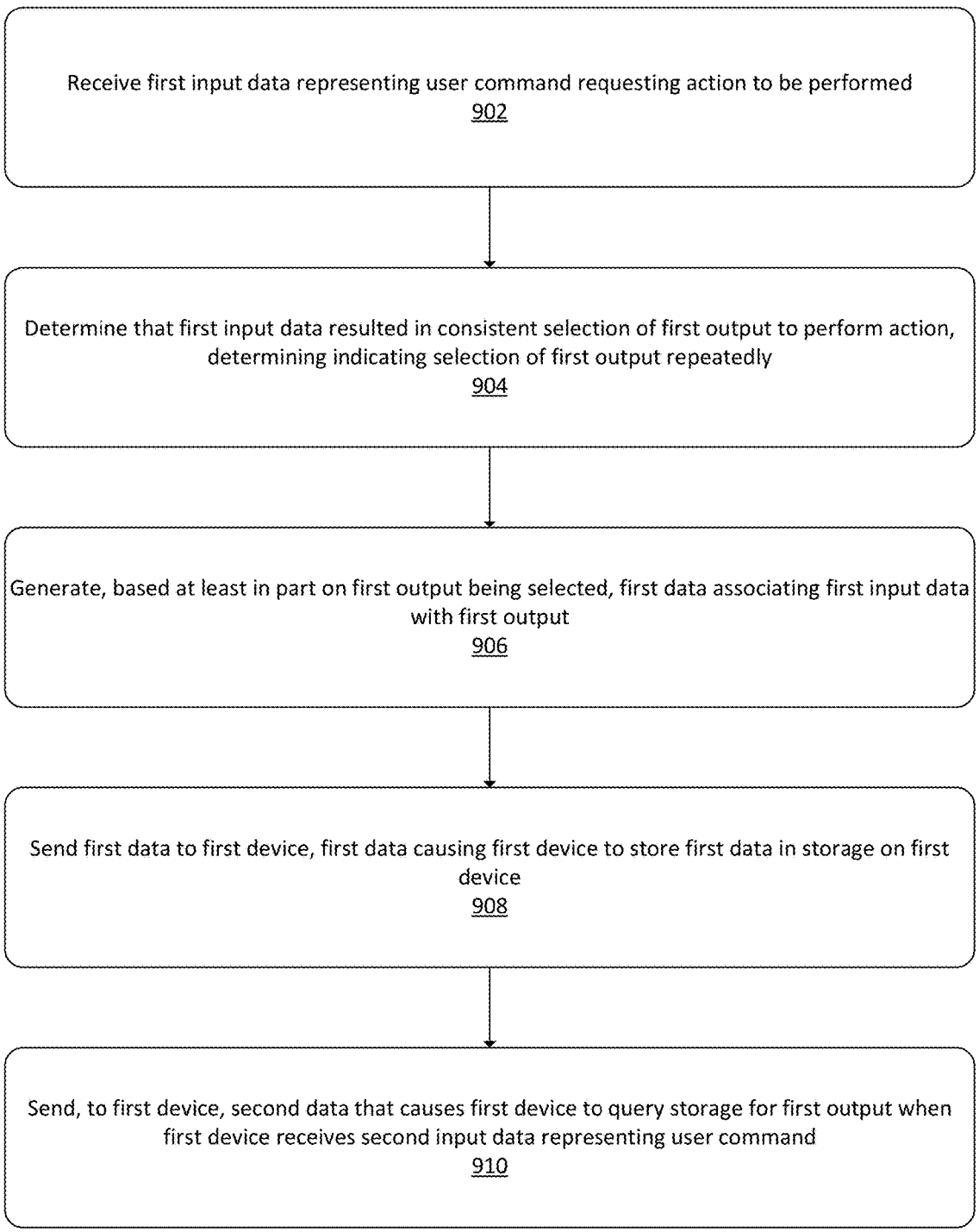
FIG. 9 illustrates a flow diagram of another example process for caching on-device commands utilizing utterance patterns.

FIG. 9 illustrates a flow diagram of another example process for caching on-device commands utilizing utterance patterns. The order in which the operations or steps are described is not intended to be construed as a limitation, and any number of the described operations may be combined in any order and/or in parallel to implement process 900.

At block 902, the process 900 may include receiving first input data representing a user command requesting an action to be performed. For example, audio data representing user utterances may be generated over time and commands to perform actions may be determined for those user utterances. For given account data associated with a given voice interface device and/or group of voice interface devices, a pattern generator of the system may query a data store of historical utterances and their corresponding commands to identify when a given utterance is consistently associated with a given command. For example, over a period of time, such as one month, users associated with given account data may provide multiple utterances. Those utterances may include, for example, "tell me the time," "turn on kitchen light," "turn on porch light at 5:00 am," etc. The number of utterances may be dozens and/or hundreds during the period of time.

At block 904, the process 900 may include determining that the first input data resulted in consistent selection of a first output to perform the action, the determining indicating selection of the first output repeatedly. For example, a pattern generator may determine which of these utterances was consistently associated with a given command. Utilizing the example utterances above, the utterance "tell me the time" may have been identified 20 times during the period of time, and while the utterance itself was consistently the same, the associated command will differ because the response to the utterance will depend on the time as kept by the voice interface device when the utterance is received. In other words, a first command responsive to the utterance "tell me the time" may be to output audio including "8:00 am," while a second command responsive to the same utterance may be to output audio including "9:00 pm." As such, for these utterances the pattern generator may determine that the associated commands are not consistent.

However, for the utterance "turn on kitchen light," the pattern generator may determine that a consistent command was associated with the utterance. In other words, a first command responsive to the utterance "turn on kitchen light" may be to cause a device with the naming indicator of "kitchen light" to emit light, while a second command responsive to the same utterance may be to cause the same device to perform the same action. Keeping with the example above, the "turn on kitchen light" utterance may be received 25 times during the period of time, and the command responsive to that utterance may consistently be the same command and/or may be the same command at least a threshold number of times and/or at least a threshold percentage of the time, for example.

At block 906, the process 900 may include generating, based at least in part on the first output being selected, first data associating the first input data with the first output. For example, pattern data may be generated indicating an association between the data representing the utterance and the command.

At block 908, the process 900 may include sending the first data to a first device, the first data causing the first device to store the first data in storage on the first device. For example, the voice interface device may include a storage configured to store the pattern data and to retrieve the pattern data when queried to do so.

At block 910, the process 900 may include sending, to the first device, second data that causes the first device to query the storage for the first output when the first device receives second input data representing the user command. For example, when the device processes audio data representing an utterance, the storage may be queried to determine if the determined utterance is present in the storage. In instances where the utterance is present, the storage may return results indicating the associated command, which may be utilized in response to the utterance.

Additionally, or alternatively, the process 900 may include identifying a feature developed in association with the category of commands. The process 900 may also include generating third data associating an utterance with a second command associated with the feature. The process 900 may also include determining that account data associated with the first device indicates prior utilization of the category of commands. The process 900 may also include, based at least in part on the account data indicating prior utilization of the category of commands, sending the third data to the first device, the third data causing the first device to store the third data in the storage.

Additionally, or alternatively, the process 900 may include including the storage on an off-device system and receiving, from the first device, third input data representing the user command. The process 900 may also include querying, based at least in part on receiving the indication, the storage on the off-device system for the first third input data. The process 900 may also include receiving, from the storage on the off-device system, third data indicating the first output associated with the user command. The process 900 may also include sending, based at least in part on the user command being associated with the first output in the storage, the first output to the first device.

Additionally, or alternatively, the process 900 may include determining, from multiple user accounts, that processing of third input data resulted in a consistent selection of a second output associated with devices having a device type. The process 900 may also include generating third data associating reference input data with the second output. The process 900 may also include determining that the first device is associated with a second device having the device type. The process 900 may also include sending the third data to the first device based at least in part on the first device being associated with the second device, the third data causing the first device to store the third data in the storage.

Additionally, or alternatively, the process 900 may include receiving third input data at a speech processing system. The process 900 may also include determining that the third input data represents the user command. The process 900 may also include determining that the first device unsuccessfully processed the third input data at the first device. The process 900 may also include querying, based at least in part on the first device unsuccessfully processing the third input data, the storage as stored in association with the speech processing system. The process 900 may also include sending the first output to the first device based at least in part on receiving an indication from the storage that the user command is associated with the first output.

Additionally, or alternatively, the process 900 may include receiving, from the first device, third data indicating the first device selected the first output to respond to third input data received at the first device. The process 900 may also include determining that a speech processing system selected a second output to respond to the third input data, wherein the second output differs from the first output. The process 900 may also include sending, based at least in part on the first device selecting the first output while the speech processing system selected the second output, fourth data instructing the first device to remove the first data from the storage.

Additionally, or alternatively, the process 900 may include receiving, from the first device, third data indicating the first device selected the first output to respond to third input data representing the user command received at the first device. The process 900 may also include determining that a speech processing system selected a second output to respond to the third input data, wherein the second output differs from the first output. The process 900 may also include sending, based at least in part on the first device selecting the first output while the speech processing system selected the second output, fourth data instructing the first device to associate the user command with the second output instead of the first output.

Additionally, or alternatively, the process 900 may include receiving, over a period of time, third input data representing a second user command received in association with multiple user accounts excluding user account data associated with the first device. The process 900 may also include determining that the third input data resulted in consistent selection of a second output across the multiple user accounts. The process 900 may also include generating third data associating the second output with the third input data. The process 900 may also include sending the third data to the first device, the third data causing the first device to store the third data in the storage.

Figure 10:
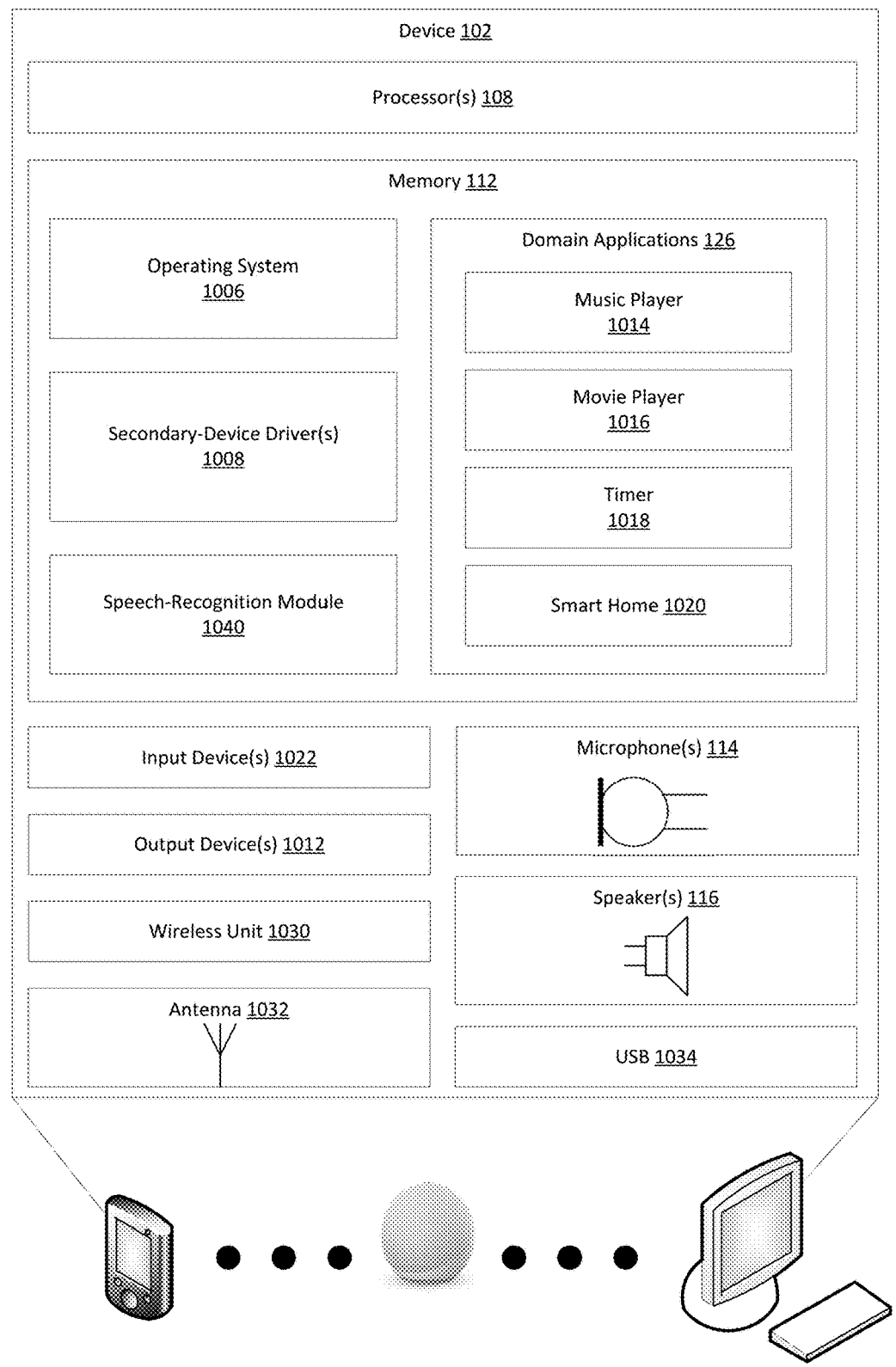
FIG. 10 illustrates a conceptual diagram of components of an example device on which stored commands may be stored and utilized.

FIG. 10 illustrates a conceptual diagram of components of an example device on which stored commands may be stored and utilized. The device 102 may be implemented as a standalone device that is relatively simple in terms of functional capabilities with limited input/output components, memory, and processing capabilities. For instance, the device 102 does not have a keyboard, keypad, or other form of mechanical input. Nor does it have a display (other than simple lights, for instance) or touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 102 is through voice input and audible output.

The device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the device 102 includes one or more processors 108 and memory 112. In some implementations, the processors(s) 108 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 may possess its own local memory, which also may store program modules, program data, and/or one or more operating systems. The memory 112 may include components described with respect to FIG. 1.

Several modules such as instruction, datastores, and so forth may be stored within the memory 112 and configured to execute on the processor(s) 108. A few example functional modules are shown as applications stored in the memory 112 and executed on the processor(s) 108, although the same functionality may alternatively be implemented in hardware, firmware, or as a system on a chip (SOC). At least some of the components shown in FIG. 1 may also be stored in the memory 112 and executable by the processor(s) 108 to implement the functionality described herein.

An operating system component 1006 may be configured to manage hardware within and coupled to the device 102 for the benefit of other components. In addition, in some instances the device 102 may include some or all of one or more secondary-device drivers 1008. In other instances, meanwhile, the device 102 may be free from the drivers 1008 for interacting with second devices. The device 102 may further including, in some instances, a speech-recognition module 1040, which may correspond to the on-device speech processing described with reference to FIG. 1.

The device 102 may also include a plurality of applications 126 stored in the memory 112 or otherwise accessible to the device 102. In this implementation, the applications 126 are a music player 1014, a movie player 1016, a timer 1018, and a smart home application 1020. However, the device 102 may include any number or type of applications and is not limited to the specific examples shown here. The music player 1014 may be configured to play songs or other audio files. The movie player 1016 may be configured to play movies or other audio visual media. The timer 1018 may be configured to provide the functions of a simple timing device and clock. The smart home application 1020 may be configured to assist in controlling smart devices. When implementing the "hybrid" functionality described herein where a system 104 is unavailable to the device 102 and/or when the device 102 is configured to respond to intents without aid from the system 104, these applications 126 may be configured to access on-device resources (e.g., on-device music or movie libraries, an on-device shopping list, an on-device calendar, etc.). In some cases, changes made to these on-device resources may be synched with off-device versions of those resources when the system 104 subsequently becomes available to the device 102.

Generally, the device 102 has input devices 1022 and output devices 1012. The input devices 1022 may include, without limitation, a keyboard, keypad, mouse, touch screen, joystick, control buttons, etc. In some implementations, one or more microphones 114, which may be similar to the microphone(s) 114 of FIG. 1, may function as input devices 1022 to receive audio input, such as user voice input. The output device(s) 1012 may be similar to the output device(s) of FIG. 1, and may include, without limitation, a display(s), a light element (e.g., LED), a vibrator to create haptic sensations, or the like. In some implementations, one or more speakers 116 may function as output devices 1012 to output audio sounds (e.g., audio content, TTS responses, tones at various frequencies, etc.).

A user may interact with the device 102 by speaking to it, and the one or more microphone(s) 114 captures the user's speech. The device 102 can communicate back to the user by emitting audible statements through the speaker 116. In this manner, the user can interact with the device 102 solely through speech, without use of a keyboard or display.

The device 102 may further include a wireless unit 1030 coupled to an antenna 1032 to facilitate a wireless connection to a network. The wireless unit 1030 may implement one or more of various wireless and/or IoT technologies, such as Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do and/or do not rely data transmission over the wide area network 108. As such, the device 102 may be configured to act as a hub that can communicate with second devices in the environment and control the second devices, such as by using protocol stacks, drivers, and adapters to communicate over a suitable communications protocol. A USB port 1034 may further be provided as part of the device 102 to facilitate a wired connection to a network, or a plug-in network device that communicates with other wireless networks. In addition to the USB port 1034, or as an alternative thereto, other forms of wired connections may be employed, such as a broadband connection, Transmission Control Protocol/Internet Protocol (TCP/IP) protocol connection, etc. The communications interface 110 of FIG. 1 may include some or all of these components, and/or other components to facilitate communication with other devices.

Accordingly, when implemented as the primarily-voice-operated speech interface device 102, there may be no input devices, such as navigation buttons, keypads, joysticks, keyboards, touch screens, and the like other than the microphone(s) 114. Further, there may be no output such as a display for text or graphical output. The speaker(s) 116 may be the main output device. In one implementation, the device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 102 may be implemented as an aesthetically appealing device with smooth and rounded surfaces, with one or more apertures for passage of sound waves. The device 102 may merely have a power cord and optionally a wired interface (e.g., broadband, USB, etc.). As a result, the device 102 may be generally produced at a low cost. Once plugged in, the device 102 may automatically self-configure, or with slight aid of the user, and be ready to use. In other implementations, other I/O components may be added to this basic model, such as specialty buttons, a keypad, display, and the like.

Figure 11:
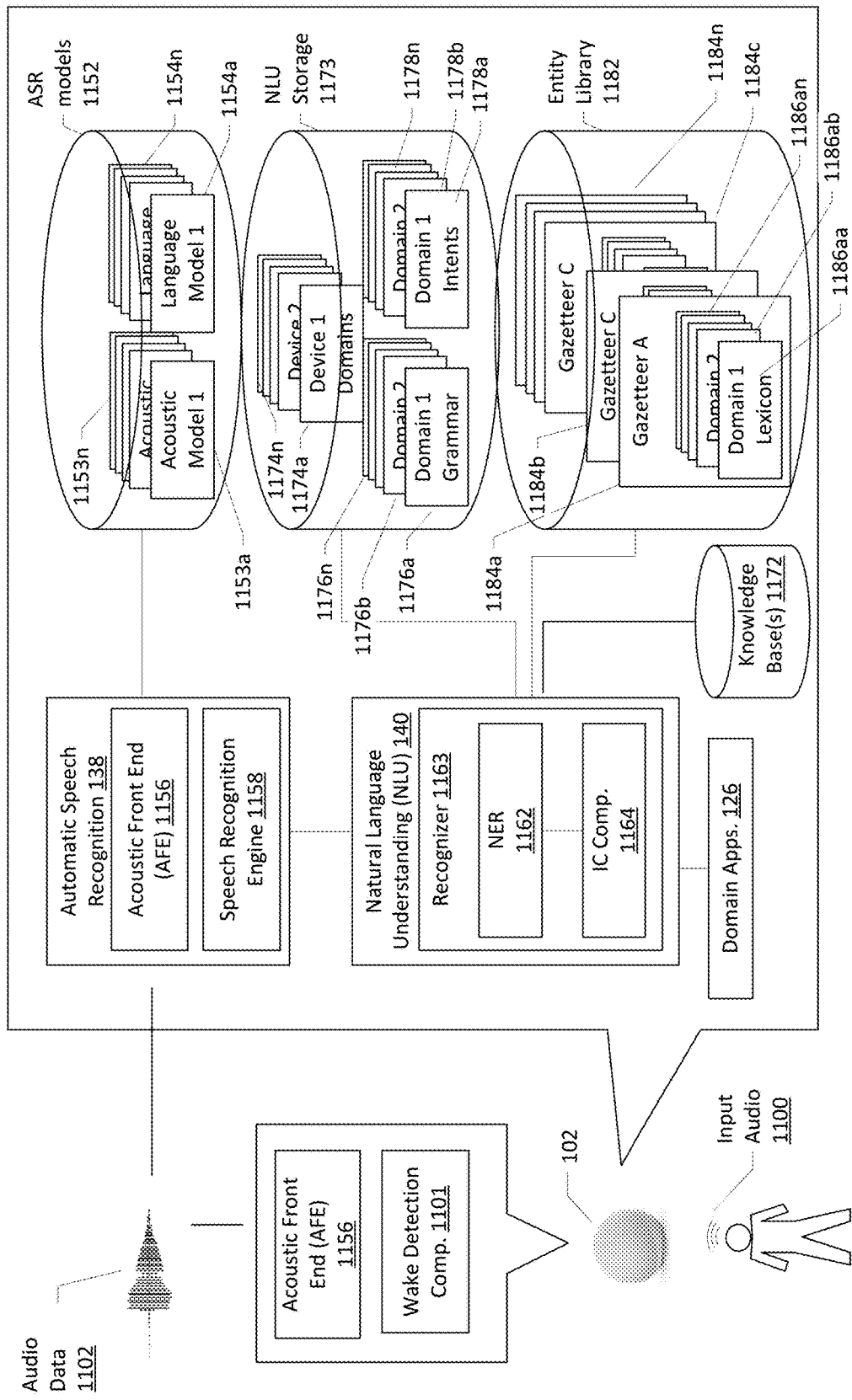
FIG. 11 illustrates a conceptual diagram of components of a speech-processing system for processing audio data provided by one or more devices.

FIG. 11 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 11 may occur directly or across a network 106. An audio capture component, such as a microphone 114 of the device 102, or another device, captures audio 1100 corresponding to a spoken utterance. The device 102, using a wake word engine 1101, then processes audio data corresponding to the audio 1100 to determine if a keyword (such as a wakeword) is detected in the audio data. Following detection of a wakeword, the device 102 processes audio data 1102 corresponding to the utterance utilizing an ASR component 138. The audio data 1102 may be output from an optional acoustic front end (AFE) 1156 located on the device prior to transmission. In other instances, the audio data 1102 may be in a different form for processing by a remote AFE 1156, such as the AFE 1156 located with the ASR component 138.

The wake word engine 1101 works in conjunction with other components of the user device, for example a microphone to detect keywords in audio 1100. For example, the device may convert audio 1100 into audio data, and process the audio data with the wake word engine 1101 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1101 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1101 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the device 102 may "wake." The audio data 1102 may include data corresponding to the wakeword. Further, a device may "wake" upon detection of speech/spoken audio above a threshold, as described herein. An ASR component 138 may convert the audio data 1102 into text. The ASR transcribes audio data into text data representing the words of the speech contained in the audio data 1102. The text data may then be used by other components for various purposes, such as executing system commands, inputting data, etc. A spoken utterance in the audio data is input to a processor configured to perform ASR which then interprets the utterance based on the similarity between the utterance and pre-established language models 1154 stored in an ASR model knowledge base (ASR Models Storage 1152). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1153 stored in an ASR Models Storage 1152), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 138 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1156 and a speech recognition engine 1158. The acoustic front end (AFE) 1156 transforms the audio data from the microphone into data for processing by the speech recognition engine 1158. The speech recognition engine 1158 compares the speech recognition data with acoustic models 1153, language models 1154, and other data models and information for recognizing the speech conveyed in the audio data. The AFE 1156 may reduce noise in the audio data and divide the digitized audio data into frames representing time intervals for which the AFE 1156 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1158 may process the output from the AFE 1156 with reference to information stored in speech/model storage (1152). Alternatively, post front-end processed data (such as feature vectors) may be received by the device executing ASR processing from another source besides the internal AFE. For example, the user device may process audio data into feature vectors (for example using an on-device AFE 1156).

The speech recognition engine 1158 attempts to match received feature vectors to language phonemes and words as known in the stored acoustic models 1153 and language models 1154. The speech recognition engine 1158 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, order ice cream and milk?" The wake detection component may identify the wake word, otherwise described as a trigger expression, "Alexa," in the user utterance and may "wake" based on identifying the wake word. The speech recognition engine 1158 may identify, determine, and/or generate text data corresponding to the user utterance, here "order ice cream and milk."

The speech recognition engine 1158 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1158 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 140 may include various components, including potentially dedicated processor(s), memory, storage, etc. As shown in FIG. 11, an NLU component 140 may include a recognizer 1163 that includes a named entity recognition (NER) component 1162 which is used to identify portions of query text that correspond to a named entity that may be recognizable by the system. A downstream process called named entity resolution links a text portion to a specific entity known to the system. To perform named entity resolution, the system may utilize gazetteer information (1184*a*-1184*n*) stored in entity library storage 1182. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 138 based on the utterance input audio 1100) and attempts to make a semantic interpretation of the text. That is, the NLU process determines the meaning behind the text based on the individual words and then implements that meaning. NLU processing 140 interprets a text string to derive an intent or a desired action from the user as well as the pertinent pieces of information in the text that allow a device (e.g., device 102) to complete that action. For example, if a spoken utterance is processed using ASR 138 and outputs the text "order ice cream and milk" the NLU process may determine that the user intended to order food, with the food being ice cream and milk.

The NLU 140 may process several textual inputs related to the same utterance. For example, if the ASR 138 outputs N text segments (as part of an N-best list), the NLU may process all N outputs to obtain NLU results.

As will be discussed further below, the NLU process may be configured to parse and tag to annotate text as part of NLU processing. For example, for the text "order ice cream and milk," "order" may be tagged as a command (to purchase items) and "ice cream" and "milk" may be tagged as the naming identifiers of the items to be purchased.

To correctly perform NLU processing of speech input, an NLU process 140 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1162 receives a query in the form of ASR results and attempts to identify relevant grammars and lexical information that may be used to construe meaning. To do so, the NLU component 140 may begin by identifying potential domains that may relate to the received query. The NLU storage 1173 includes a database of devices (1174*a*-1174*n*) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1163, language model and/or grammar database (1176a-1176n), a particular set of intents/actions (1178a-1178n), and a particular personalized lexicon (1186). Each gazetteer (1184a-1184n) may include domain-indexed lexical information associated with a particular user and/or device. For example, the Gazetteer A (1184a) includes domain-index lexical information 1186aa to 1186an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1164 parses the query to determine an intent or intents for each identified domain, where the intent corresponds to the action to be performed that is responsive to the query. Each domain is associated with a database (1178a-1178n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1164 identifies potential intents for each identified domain by comparing words in the query to the words and phrases in the intents database 1178. In some instances, the determination of an intent by the IC component 1164 is performed using a set of rules or templates that are processed against the incoming text to identify a matching intent.

In order to generate a particular interpreted response, the NER 1162 applies the grammar models and lexical information associated with the respective domain to actually recognize a mention of one or more entities in the text of the query. In this manner, the NER 1162 identifies "slots" or values (i.e., particular words in query text) that may be needed for later command processing. Depending on the complexity of the NER 1162, it may also label each slot with a type of varying levels of specificity (such as noun, place, device name, device location, city, artist name, song name, amount of time, timer number, or the like). Each grammar model 1176 includes the names of entities (i.e., nouns) commonly found in speech about the particular domain (i.e., generic terms), whereas the lexical information 1186 from the gazetteer 1184 is personalized to the user(s) and/or the device. For instance, a grammar model associated with the shopping domain may include a database of words commonly used when people discuss shopping.

The intents identified by the IC component 1164 are linked to domain-specific grammar frameworks (included in 1176) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1176) framework or frameworks may correspond to sentence structures such as "purchase item called 'Item A' from Marketplace A."

For example, the NER component 1162 may parse the query to identify words as subject, object, verb, preposition, etc., based on grammar rules and/or models, prior to recognizing named entities. The identified verb may be used by the IC component 1164 to identify intent, which is then used by the NER component 1162 to identify frameworks. A framework for the intent of "play a song," meanwhile, may specify a list of slots/fields applicable to play the identified "song" and any object modifier (e.g., specifying a music collection from which the song should be accessed) or the like. The NER component 1162 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1162 may search the database of generic words associated with the domain (in the knowledge base 1172). So, for instance, if the query was "identify this song," after failing to determine which song is currently being output, the NER component 1162 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 126 and/or an application 140. The application 126 and/or application 140 may be determined based on the NLU output. For example, if the NLU output includes a command to send a message, the application 126 and/or application 140 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the application 126 and/or application 140 may provide some or all of this information to a text-to-speech (TTS) engine. The TTS engine may then generate an actual audio file for outputting the audio data determined by the application (e.g., "okay," or "items ordered").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 140 during runtime operations where NLU operations are performed on text (such as text output from an ASR component 138). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1163. Each recognizer may include various NLU components such as an NER component 1162, IC component 1164 and other components such as an entity resolver, or other components.

For example, a messaging domain recognizer 1163-A (Domain A) may have an NER component 1162-A that identifies what slots (i.e., portions of input text) may correspond to particular words relevant to that domain. The words may correspond to entities such as (for the messaging domain) a recipient. An NER component 1162 may use a machine learning model, such as a domain specific conditional random field (CRF) to both identify the portions corresponding to an entity as well as identify what type of entity corresponds to the text portion. The messaging domain recognizer 1163-A may also have its own intent classification (IC) component 1164-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims.

What is claimed is:

1. A system, comprising:

one or more processors; and non-transitory computer-readable media storing computer-executable instructions that, when executed by the one or more processors, cause the one or more processors to perform operations comprising:

receiving, over a period of time, first audio data representing utterances received at a voice interface device associated with account data, the utterances requesting an action to be performed by a first device associated with the voice interface device;

determining that the first audio data over the period of time resulted in selection of a first command for devices having a device type to perform the action being sent, the determining indicating selection of the first command repeatedly;

determining that the voice interface device is associated with the devices having the device type;

generating, in response to determining that the first command was selected repeatedly, first data associating intent data with the first command;

sending the first data to the voice interface device based at least in part on the voice interface device being associated with the devices having the device type, the first data causing the voice interface device to store the first data in a storage; and sending, to the voice interface device, second data that causes the voice interface device to, when the voice interface device receives second audio data indicating the intent data:

determine the intent data;

query the storage for the first data; and in response to the storage including the intent data, cause the first command from the storage to be utilized instead of querying a remote speech processing system for the first command.

2. The system of claim 1, wherein the first command is associated with a category of commands, and the operations further comprise:

identifying, after the first data is generated, a feature developed in association with the category of commands;

generating third data associating reference intent data with a second command associated with the feature;

determining that the account data indicates prior utilization of the category of commands; and in response to the account data indicating prior utilization of the category of commands, sending the third data to the voice interface device, the third data causing the voice interface device to store the third data in the storage.

3. The system of claim 1, the operations further comprising:

receiving an indication that processing of third audio data representing the intent data failed on the voice interface device;

determining the intent data from the third audio data;

querying, in response to receiving the indication, the storage as stored on the system for the intent data;

receiving, from the storage as stored on the system, response data indicating the first command is associated with the intent data; and sending, in response to the intent data being associated with the first command in the storage as stored on the system, the first command to the voice interface device.

4. The system of claim 1, the operations further comprising:
- determining, from multiple user accounts, that processing of third audio data resulted in a consistent selection of a second command to operate the devices having the device type;
- generating third data associating reference intent data with the second command;
- determining, from the account data, that the voice interface device is associated with a second device having the device type; and
- sending the third data to the voice interface device in response to determining the voice interface device is associated with the second device having the device type, the third data causing the voice interface device to store the third data in the storage.

5. A method, comprising:
- receiving first input data representing a user command requesting an action to be performed;
- determining that the first input data resulted in consistent selection of a first output to perform the action, the first output associated with devices having a device type, the determining indicating selection of the first output repeatedly;
- determining that a first device is associated with the devices having the device type;
- generating, based at least in part on the first output being selected, first data associating the first input data with the first output;
- sending the first data to the first device based at least in part on the first device being associated with the devices having the device type, the first data causing the first device to store the first data in storage on the first device; and
- sending, to the first device, second data that causes the first device to query the storage for the first output when the first device receives second input data representing the user command instead of querying a remote speech processing system for the first output.

6. The method of claim 5, wherein the first output is associated with a category of commands, and the method further comprises:
- identifying a feature developed in association with the category of commands;
- generating third data associating reference input data with a second output associated with the feature;
- determining that account data associated with the first device indicates prior utilization of the category of commands; and
- based at least in part on the account data indicating prior utilization of the category of commands, sending the third data to the first device, the third data causing the first device to store the third data in the storage.

7. The method of claim 5, further comprising:
- including the storage on an off-device system;
- receiving, from the first device, third input data representing the user command;
- querying, based at least in part on receiving the third input data, the storage on the off-device system for the third input data;
- receiving, from the storage on the off-device system, third data indicating the first output associated with the user command; and
- sending, based at least in part on the user command being associated with the first output in the storage, the first output to the first device.

8. The method of claim 5, further comprising:
- determining, from multiple user accounts, that processing of third input data resulted in a consistent selection of a second output associated with the devices having the device type;
- generating third data associating reference input data with the second output;
- determining that the first device is associated with a second device having the device type; and
- sending the third data to the first device based at least in part on the first device being associated with the second device, the third data causing the first device to store the third data in the storage.

9. The method of claim 5, further comprising:
- receiving third input data at a speech processing system;
- determining that the third input data represents the user command;
- determining that the first device unsuccessfully processed the third input data at the first device;
- querying, based at least in part on the first device unsuccessfully processing the third input data, the storage as stored in association with the speech processing system; and
- sending the first output to the first device based at least in part on receiving an indication from the storage that the user command is associated with the first output.

10. The method of claim 5, further comprising:
- receiving, from the first device, third data indicating the first device selected the first output to respond to third input data received at the first device;
- determining that a speech processing system selected a second output to respond to the third input data, wherein the second output differs from the first output; and
- sending, based at least in part on the first device selecting the first output while the speech processing system selected the second output, fourth data instructing the first device to remove the first data from the storage.

11. The method of claim 5, further comprising:
- receiving, from the first device, third data indicating the first device selected the first output to respond to third input data representing the user command received at the first device;
- determining that a speech processing system selected a second output to respond to the third input data, wherein the second output differs from the first output; and
- sending, based at least in part on the first device selecting the first output while the speech processing system selected the second output, fourth data instructing the first device to associate the user command with the second output instead of the first output.

12. The method of claim 5, further comprising:
- receiving, over a period of time, third input data representing a second user command received in association with multiple user accounts excluding user account data associated with the first device;
- determining that the third input data resulted in consistent selection of a second output across the multiple user accounts;
- generating third data associating the second output with the third input data; and
- sending the third data to the first device, the third data causing the first device to store the third data in the storage.

13. A system, comprising:

one or more processors; and non-transitory computer-readable media storing computer-executable instructions that, when executed by the one or more processors, cause the one or more processors to perform operations comprising:

receiving first input data representing a user command requesting an action to be performed;

determining that the first input data resulted in consistent selection of a first output to perform the action, the first output associated with devices having a device type, the determining indicating selection of the first output repeatedly;

determining that a first device is associated with the devices having the device type;

generating, based at least in part on the first output being selected, first data associating the first input data with the first output;

sending the first data to the first device based at least in part on the first device being associated with the devices having the device type, the first data causing the first device to store the first data in storage on the first device; and sending, to the first device, second data that causes the first device to query the storage for the first output when the first device receives second input data representing the user command instead of querying a remote speech processing system for the first output.

14. The system of claim 13, wherein the first output is associated with a category of commands, and the operations further comprise:

identifying a feature developed in association with the category of commands;

generating third data associating reference input data with a second output associated with the feature;

determining that account data associated with the first device indicates prior utilization of the category of commands; and based at least in part on the account data indicating prior utilization of the category of commands, sending the third data to the first device, the third data causing the first device to store the third data in the storage.

15. The system of claim 13, the operations further comprising:

including the storage on the system;

receiving, from the first device, third input data representing the user command;

querying, based at least in part on receiving the third input data, the storage on the system for the third input data;

receiving, from the storage on the system, third data indicating the first output associated with the user command; and sending, based at least in part on the user command being associated with the first output in the storage, the first output to the first device.

16. The system of claim 13, the operations further comprising:

determining, from multiple user accounts, that processing of third input data resulted in a consistent selection of a second output associated with the devices having the device type;

generating third data associating reference input data with the second output;

determining that the first device is associated with a second device having the device type; and sending the third data to the first device based at least in part on the first device being associated with the second device, the third data causing the first device to store the third data in the storage.

17. The system of claim 13, the operations further comprising:

receiving third input data;

determining that the third input data represents the user command;

determining that the first device unsuccessfully processed the third input data at the first device;

querying, based at least in part on the first device unsuccessfully processing the third input data, the storage as stored in the system; and sending the first output to the first device based at least in part on receiving an indication from the storage that the user command is associated with the first output.

18. The system of claim 13, the operations further comprising:

receiving, from the first device, third data indicating the first device selected the first output to respond to third input data received at the first device;

determining that the system selected a second output to respond to the third input data, wherein the second output differs from the first output; and sending, based at least in part on the first device selecting the first output while the system selected the second output, fourth data instructing the first device to remove the first data from the storage.

19. The system of claim 13, the operations further comprising:

receiving, from the first device, third data indicating the first device selected the first output to respond to third input data representing the user command received at the first device;

determining that the system selected a second output to respond to the third input data, wherein the second output differs from the first output; and sending, based at least in part on the first device selecting the first output while the system selected the second output, fourth data instructing the first device to associate the user command with the second output instead of the first output.

20. The system of claim 13, the operations further comprising:

receiving, over a period of time, third input data representing a second user command received in association with multiple user accounts excluding user account data associated with the first device;

determining that the third input data resulted in consistent selection of a second output across the multiple user accounts;

generating third data associating the second output with the third input data; and sending the third data to the first device, the third data causing the first device to store the third data in the storage.

* * * * *